United States Patent
Wu et al.

(10) Patent No.: US 12,490,301 B2
(45) Date of Patent: Dec. 2, 2025

(54) CONGESTION CONTROL FOR SIDELINK COMMUNICATION WITH MULTI-TRP

(71) Applicant: QUALCOMM Incorporated, San Diego, CA (US)

(72) Inventors: Shuanshuan Wu, San Diego, CA (US); Sourjya Dutta, San Diego, CA (US); Hui Guo, Beijing (CN); Kapil Gulati, Belle Mead, NJ (US); Junyi Li, Fairless Hills, PA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/015,302

(22) PCT Filed: Sep. 4, 2020

(86) PCT No.: PCT/CN2020/113542
§ 371 (c)(1),
(2) Date: Jan. 9, 2023

(87) PCT Pub. No.: WO2022/047741
PCT Pub. Date: Mar. 10, 2022

(65) Prior Publication Data
US 2023/0276494 A1    Aug. 31, 2023

(51) Int. Cl.
*H04W 74/0808* (2024.01)
*H04W 72/563* (2023.01)
*H04B 17/318* (2015.01)

(52) U.S. Cl.
CPC ..... *H04W 74/0808* (2013.01); *H04W 72/563* (2023.01); *H04B 17/318* (2015.01)

(58) Field of Classification Search
None
See application file for complete search history.

(56) References Cited

U.S. PATENT DOCUMENTS 12,273,766 B2 * 4/2025 Hassan ............... H04W 72/542
2020/0235887 A1   7/2020 Hou et al.
(Continued)

FOREIGN PATENT DOCUMENTS

| CN | 107872886 A | 4/2018 |
|---|---|---|
| CN | 109392015 A | 2/2019 |

OTHER PUBLICATIONS

Huawei, et al., "Enhancements on Multi-TRP/Panel Transmission," 3GPP TSG RAN WG1 Meeting #99, R1-1911902, Reno, USA, Nov. 18-22, 2019, (Nov. 22, 2019), the whole document, 16 pages.
(Continued)

*Primary Examiner* — Anh Vu H Ly
(74) *Attorney, Agent, or Firm* — Procopio, Cory, Hargreaves & Savitch LLP

(57) ABSTRACT

Aspects presented herein improve congestion control mechanism for UEs with multiple TRPs, where at least one of the SL RSSI measurement, the CBR measurement, the CR evaluation and/or the congestion control mechanism for the UE is optimized. In one aspect, the apparatus evaluates a CR for each TRP of a plurality of TRPs at the UE. The apparatus determines whether the UE is allowed to transmit on one or more of the TRPs of the plurality of TRPs based at least on the evaluated CR for each TRP of the plurality of TRPs and on at least one CR limit. The apparatus transmits on at least one TRP of the one or more of the TRPs based on the determination whether to transmit on the one or more TRPs.

58 Claims, 15 Drawing Sheets

(56) References Cited

U.S. PATENT DOCUMENTS

| | | | |
|---|---|---|---|
| 2021/0014893 A1* | 1/2021 | Park | H04L 5/0092 |
| 2021/0051510 A1* | 2/2021 | Chae | H04B 17/318 |
| 2021/0144570 A1* | 5/2021 | Chae | H04W 72/02 |
| 2021/0314796 A1* | 10/2021 | Hoang | H04W 72/04 |
| 2021/0377956 A1* | 12/2021 | Lee | H04W 72/541 |
| 2024/0205738 A1* | 6/2024 | Shilov | H04W 4/70 |

OTHER PUBLICATIONS

International Search Report and Written Opinion—PCT/CN2020/113542—ISA/EPO—May 27, 2021.

* cited by examiner

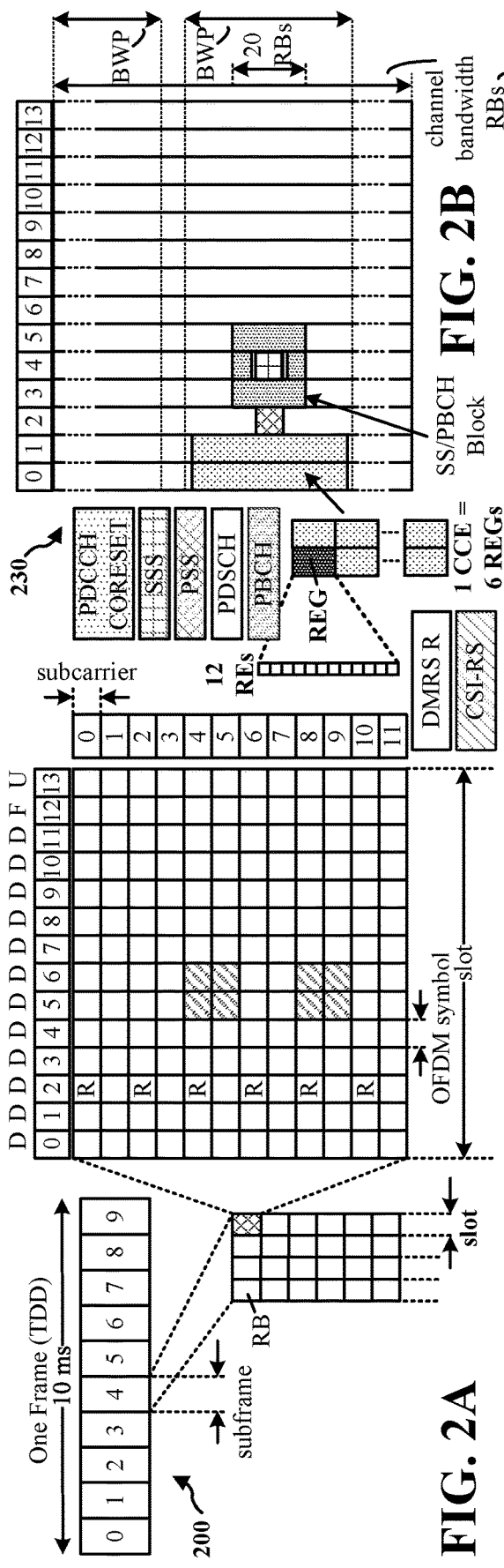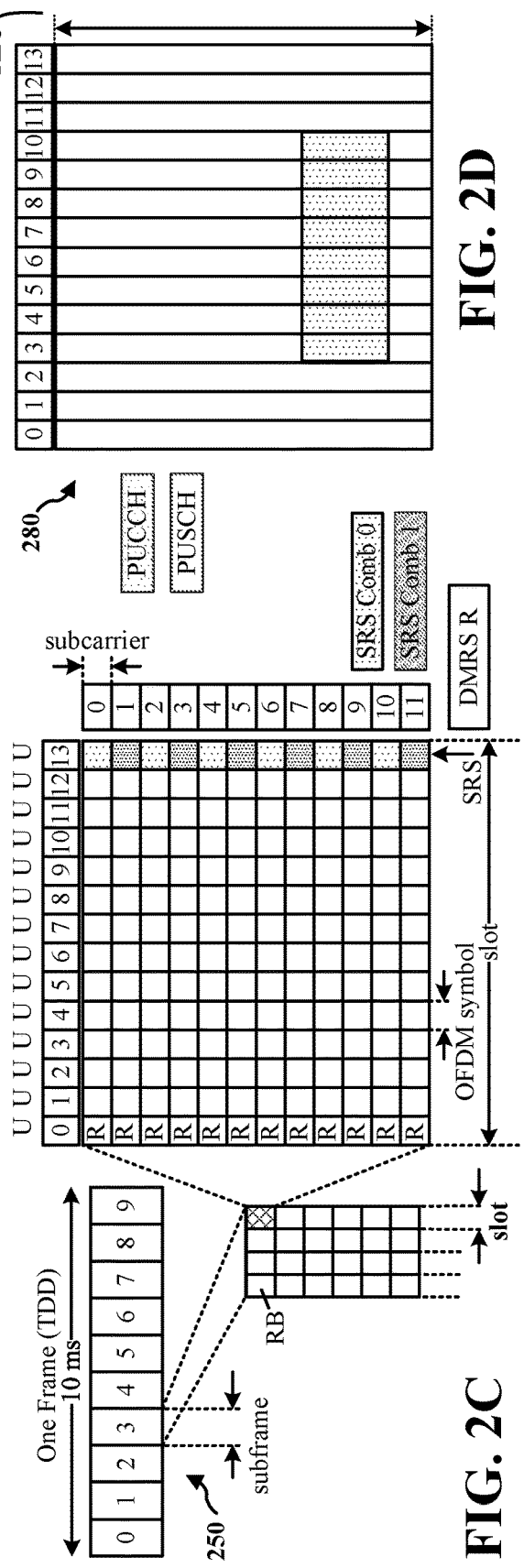

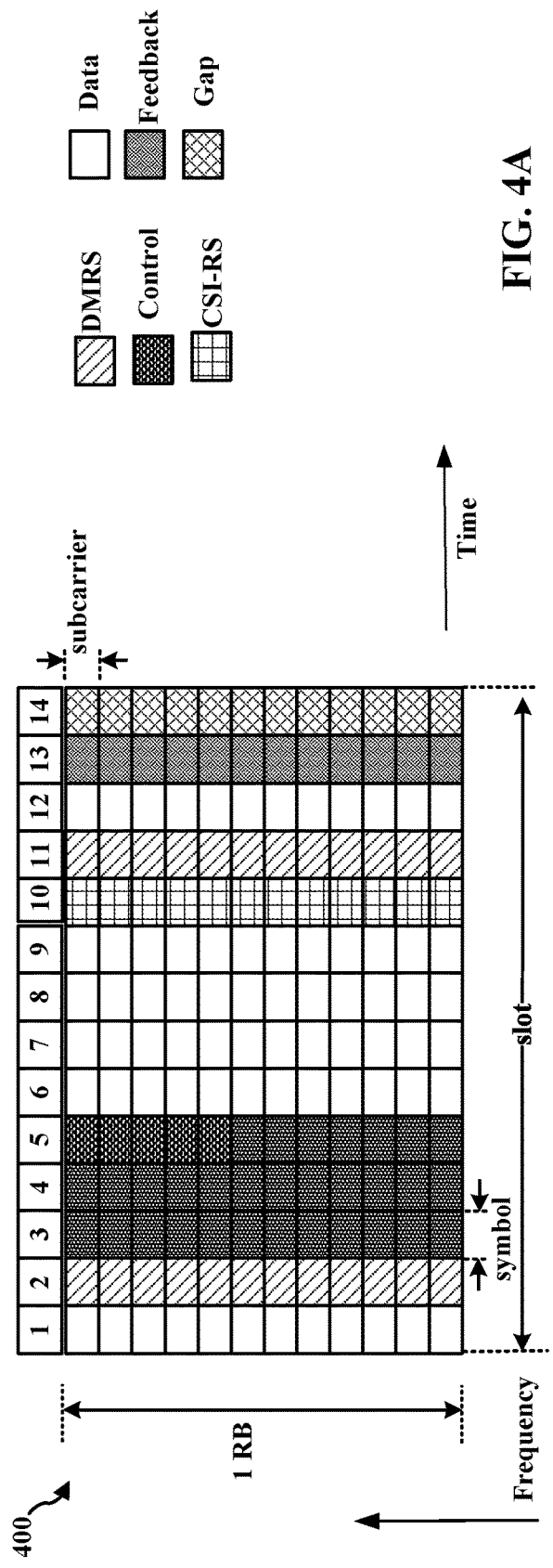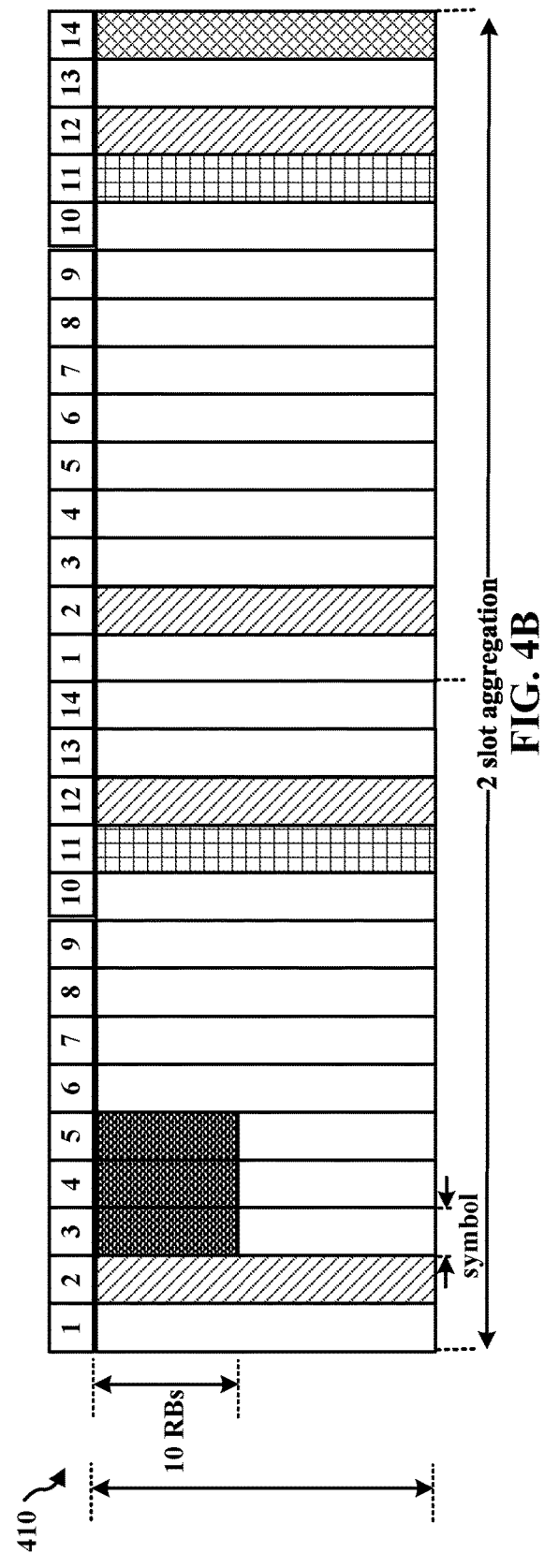
FIG. 4A
FIG. 4B

| CBR-based PSSCH transmission paramter configuration | Priority X | Priority Y | Priority Z |
|---|---|---|---|
| CBR Measured | CR Limit | CR Limit | CR Limit |
| 0 ≤ CBR measured ≤ 0.3 | No limit | No limit | No limit |
| 0.3 < CBR measured ≤ 0.6 | No limit | 0.03 | 0.02 |
| 0.6 < CBR measured ≤ 0.8 | 0.02 | 0.008 | 0.004 |
| 0.8 < CBR measured ≤ 1 | 0.02 | 0.004 | 0.002 |

FIG. 7

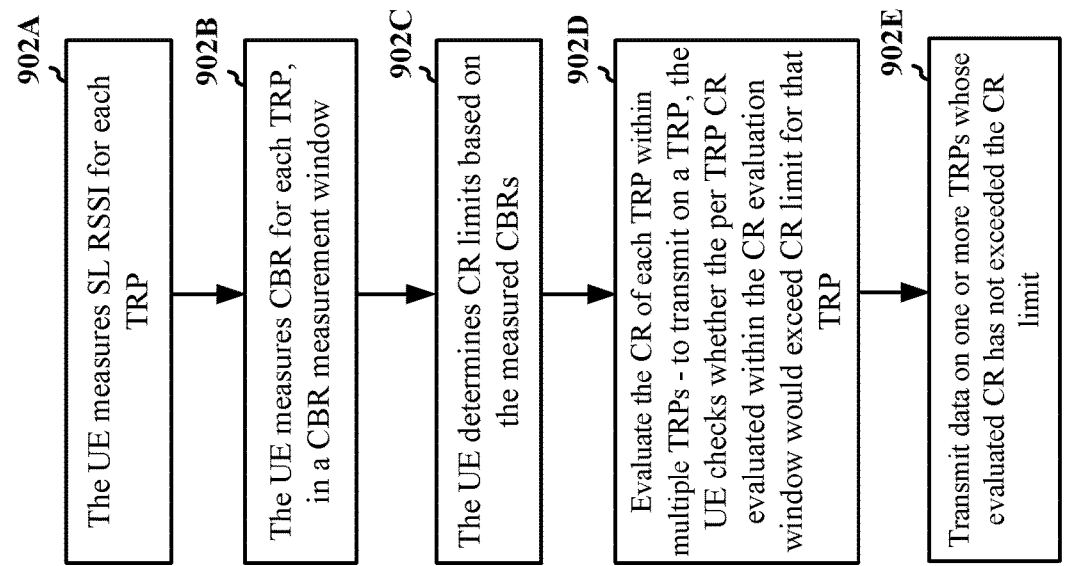
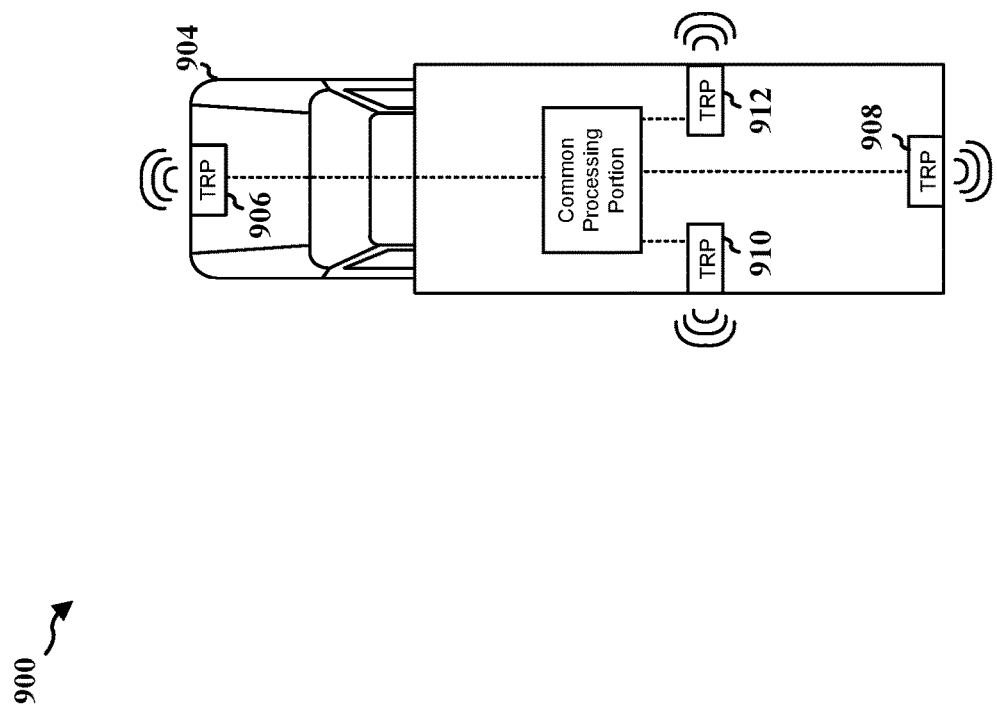
FIG. 9

CONGESTION CONTROL FOR SIDELINK COMMUNICATION WITH MULTI-TRP

CROSS REFERENCE TO RELATED APPLICATION(S)

This application is a National Stage Application filed under 35 U.S.C. § 371 of PCT International Application Serial No. PCT/CN2020/113542 entitled "CONGESTION CONTROL FOR SIDELINK COMMUNICATION WITH MULTI-TRP" and filed on Sep. 4, 2020, which is expressly incorporated by reference herein in its entirety.

BACKGROUND

Technical Field

The present disclosure relates generally to communication systems, and more particularly, to wireless communication involving congestion control for sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For a user equipment (UE) with multiple transmit-receive points (TRPs) (e.g., mTRP UEs), the UE may measure the received signal strength indicator (RSSI) of a channel at each TRP. In reporting the measured RSSI, the UE may report the largest RSSI measured. Such congestion control mechanism may be sub-optimal for mTRP UEs because the reported RSSI may not reflect the RSSI measured/observed by each individual TRP. Thus, the congestion control based on this mechanism may limit resource usage, modulation and coding scheme (MCS), and/or max transmit power for mTRP UEs.

In an aspect of the disclosure, a method, a computer-readable medium, and an apparatus are provided for wireless communication at a UE. The apparatus may evaluate a channel occupancy ratio (CR) for each TRP of a plurality of TRPs at the UE. The apparatus may determine whether the UE is allowed to transmit on one or more of the TRPs of the plurality of TRPs based at least on the evaluated CR for each TRP of the plurality of TRPs and on at least one CR limit. The apparatus may transmit on at least one TRP of the one or more of the TRPs based on the determination whether to transmit on the one or more TRPs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A and 4B illustrate example aspects of a sidelink slot structure.

FIG. 7 is a diagram illustrating an example of CBR and CR configuration.

FIG. 9 is a diagram illustrating an example of making a transmission decision for congestion control.

DETAILED DESCRIPTION

Figure 1:
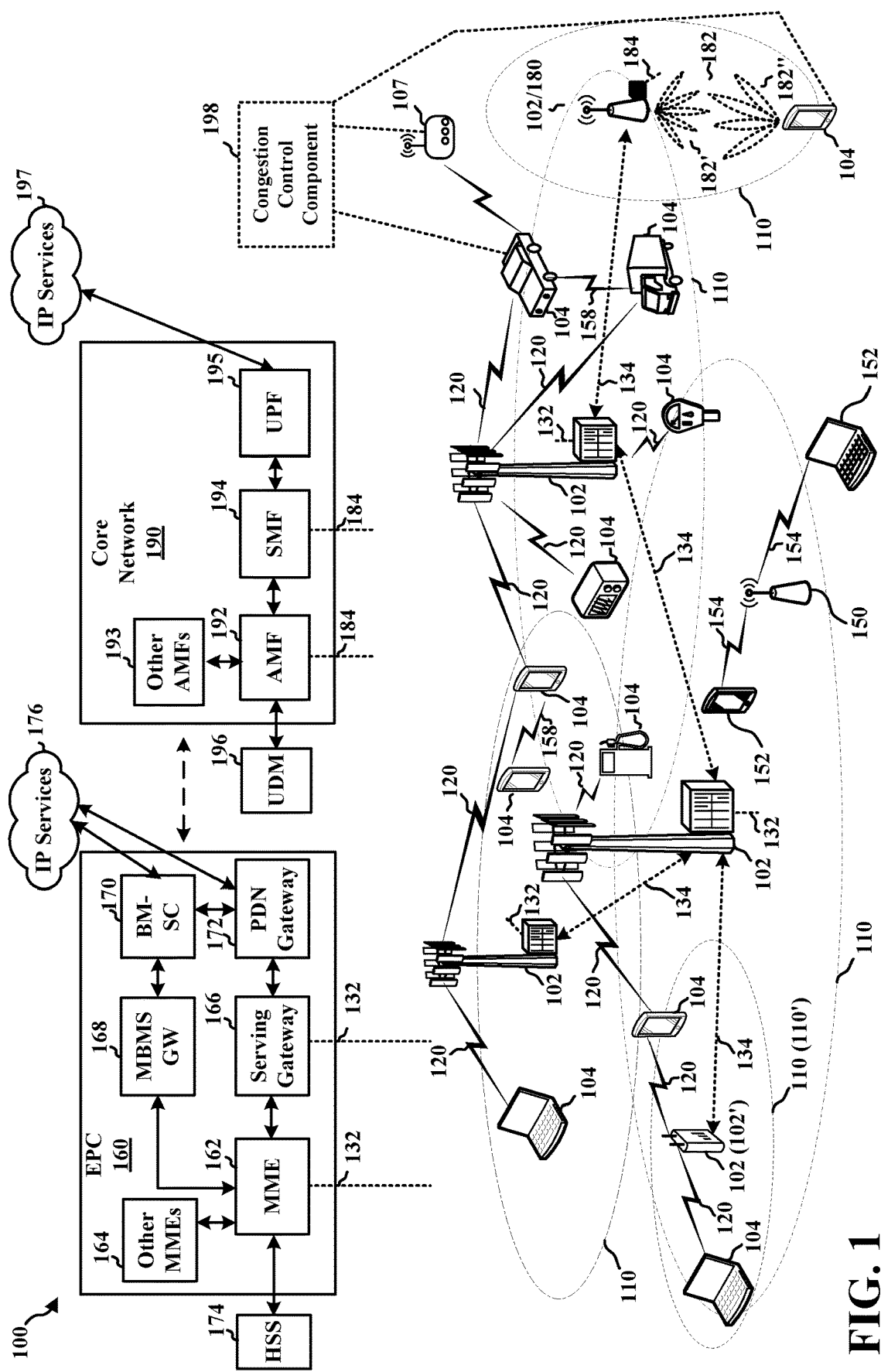
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a congestion control component 198 configured to evaluate a CR for each transmission reception point of a plurality of TRPs at the UE 104. The congestion control component 198 may further be configured to determine whether the UE 104 is allowed to transmit on one or more of the TRPs of the plurality of TRPs based at least on the evaluated CR for each TRP of the plurality of TRPs and on at least one CR limit. The congestion control component 198 may further be configured to transmit on at least one TRP of the one or more of the TRPs based on the determination whether to transmit on the one or more TRPs.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
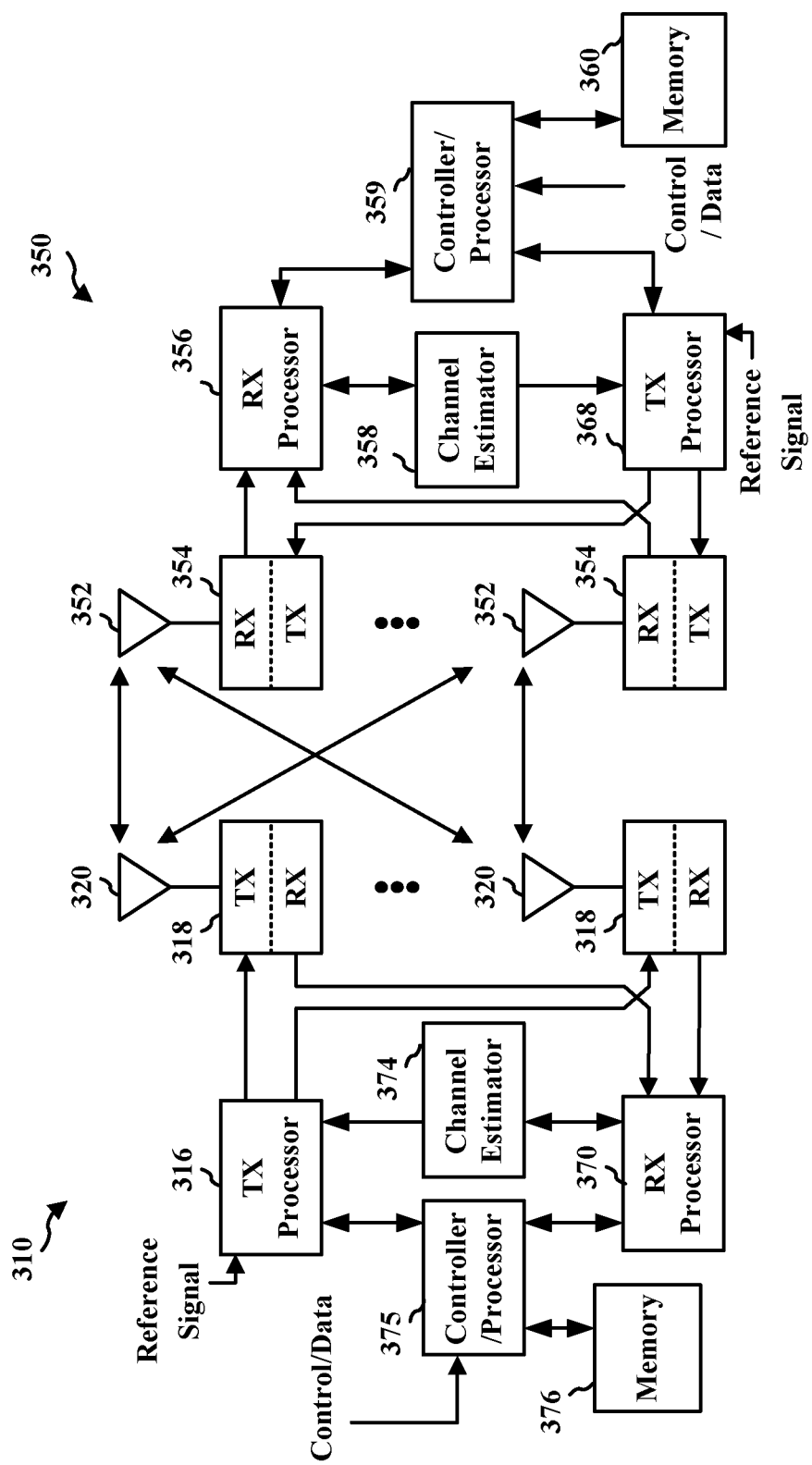
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the congestion control component 198 of FIG. 1.

FIG. 4A and 4B are diagrams 400 and 410 illustrating examples slot structures that may be used for sidelink communication (e.g., between UEs 104, RSU 107, etc.) respectively. The slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or a different channel for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single slot transmission, e.g., which may correspond to a 0.5 ms transmission time interval (TTI). Diagram 410 illustrates an example two-slot aggregation, e.g., an aggregation of two 0.5 ms TTIs. Diagram 400 illustrates a single RB, whereas diagram 410 illustrates N RBs. In diagram 410, 10 RBs being used for control is merely one example. The number of RBs may differ.

A sidelink communication may include vehicle-based communication devices that can communicate from vehicle-to-vehicle (V2V), vehicle-to-infrastructure (V2I) (e.g., from the vehicle-based communication device to road infrastructure nodes such as a road side unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as proximity-based services (ProSe), etc. In addition to UEs, sidelink communication may also be transmitted and received by other transmitting and receiving devices, such as road side unit (RSU) 107, etc. Sidelink communication may be exchanged using a PC5 interface, such as described in connection with the example in FIGS. 4A and 4B. Although the following description, including the example slot structure of FIGS. 4A and 4B, may provide examples for sidelink communication in connection with 5G NR, the concepts described herein may be applicable to other similar areas, such as LTE, LTE-A, CDMA, GSM, and other wireless technologies.

Figure 5:
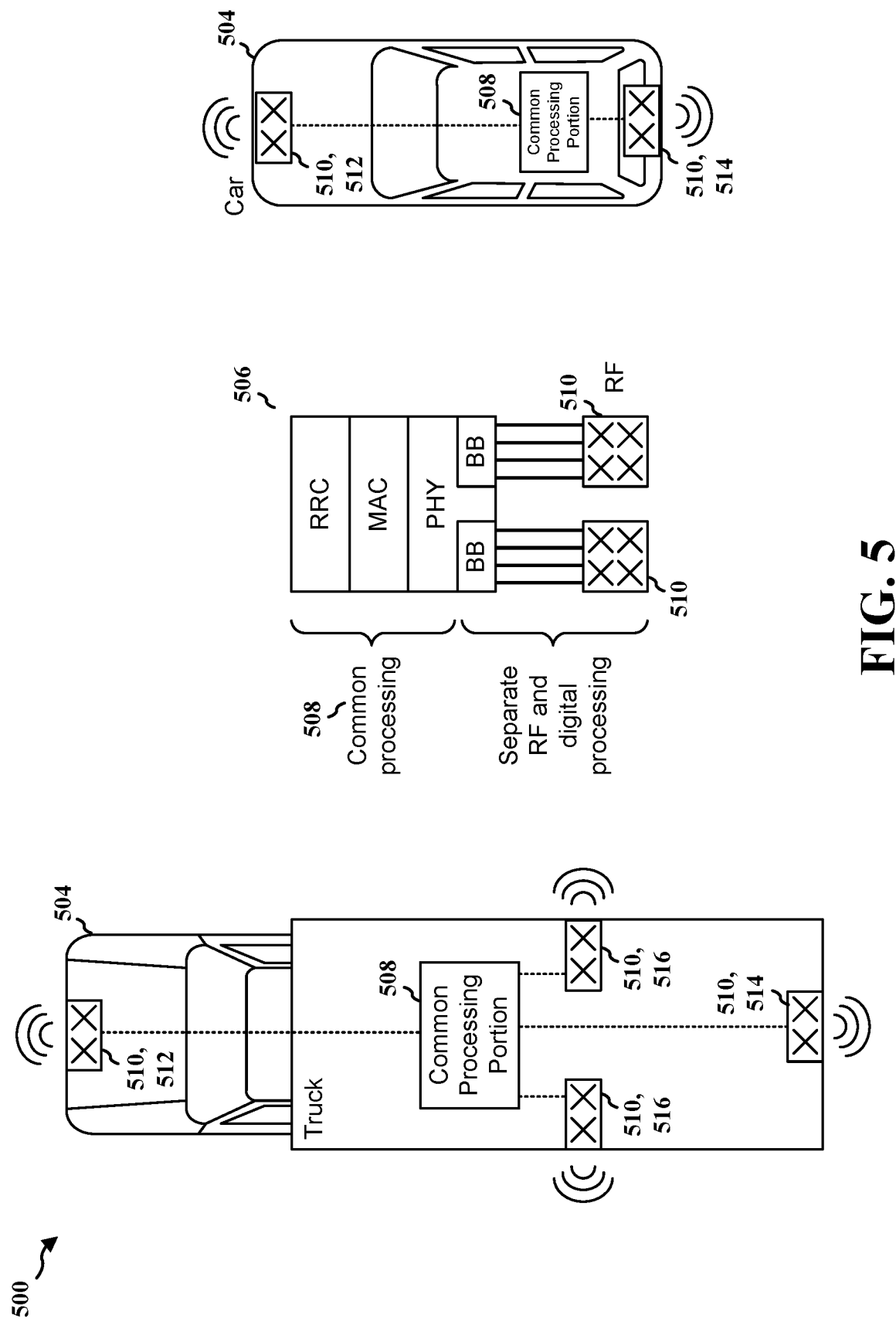
FIG. 5 is a diagram illustrating an example of vehicles with multiple TRPs.

In communicating over the sidelink, the communication device within a vehicle (e.g., car, truck, etc.) may include one common processing portion (e.g., a unit) and two or more transmit-receive points (TRPs). FIG. 5 is a diagram 500 illustrating an example of vehicles with multiple TRPs. A car or a truck (collectively as "UE 504") may include a communication device 506 (e.g., a hardware supporting multiple TRPs) that has a common processing portion 508 (e.g., a modem) for processing the data received or to be transmitted, and multiple TRPs 510 for transmitting and receiving the data (e.g., over the sidelink). For example, a car may have two TRPs 510, one in the front antenna panel (e.g., TRP 512) and another one in the rear antenna panel (e.g., TRP 514). Larger vehicles (e.g., trucks, trailers, etc.) may have more TRPs 510, such as having additional TRPs 516 on both sides of the vehicles in addition to the front and rear antenna panels (e.g., TRPs 512 and 514).

As shown by FIG. 5, TRPs 510 on the same vehicle may be separated. For example, the front and the rear antenna panels (e.g., TRPs 512 and 514) on a car may be separated by 3 to 4 meters, whereas the front and the rear antenna panels on a larger vehicle, such as a 16-wheeler trailer, may be separated by approximately 20 meters. While different TRPs (e.g., TRPs 510) may have different radio frequency (RF) modules (e.g., different brands, different designs, etc.), they may share the same hardware and/or software controller (e.g., common processing portion 508). As such, each of the TRPs within a vehicle may have different views on the condition of a channel (e.g., a channel within the sidelink for communication between two vehicles), which may be due to a difference in distance, a difference in quality of the TRPs, whether the TRP of one vehicle is in the line of sight (LOS) or non-line or sight (NLOS) with the TRP of another vehicle, and/or whether there is a blocking or interference, etc. For example, the front antenna panel (e.g., TRP 512) of a vehicle may be in the LOS with the TRP of another vehicle or the RSU (e.g., 107), whereas the rear antenna panel (e.g., TRP 514) of the vehicle may not be in the LOS with the TRP of that vehicle due to blocking. Thus, the TRP on the front antenna panel of the vehicle may observe a better channel condition/feeding than the TRP on the rear antenna panel.

In addition, UEs with multiple TRPs (e.g., UE 504) may have biased transmissions, where each TRP may have a different number of peers or different links to each peer. For instance, when there are more vehicles and/or RSUs in front of a car with multiple TRPs, the TRP on the front antenna panel of the car may have a higher traffic load than the TRP on the rear antenna panel. In another example, one TRP may have poorer link connections than other TRPs within the same vehicle due to the quality or the performance of the TRP. To compensate for or to adapt to different channel conditions or biased transmissions observed/experienced by different TRPs, it may be beneficial to adjust the power (e.g., transmission power), the MCS level, and/or other transmission parameter(s) for different TRPs based on the channel condition they observed and/or based on their traffic load. For example, the communication device 506 (or the common processing portion 508) may allocate different powers to different TRPs 510, where more power may be allocated to TRPs that observe worse channel conditions so that they may use additional power to transmit the signal, and may allocate less power to TRPs that observe better channel conditions, etc. This may enable the communication device 506 (or the common processing portion 508) to optimize the performance of the TRPs 510.

V2X communications may support autonomous resource allocation (e.g., Transmission Mode 2), where a UE (e.g., 104, 504) may access a channel based on its sensing outcomes of the channel (i.e., without relying on the base station scheduling). For example, the UE may access a channel if it senses that the channel has not been occupied by other UEs, RSUs, or base stations. Under the autonomous resource allocation mode, congestion control mechanism(s) may also be enabled or applied for the V2X communications, where the UE may be limited to transmit a certain number of transmissions within a time period in a channel based on the congestion level of the channel. For example, if the total number of transmissions from the UE within a window has exceed a threshold (e.g., a channel occupancy ratio limit), the UE may not transmit additional data within this window, and the UE may drop the current transmission or use less resources for future transmissions.

Figure 6:
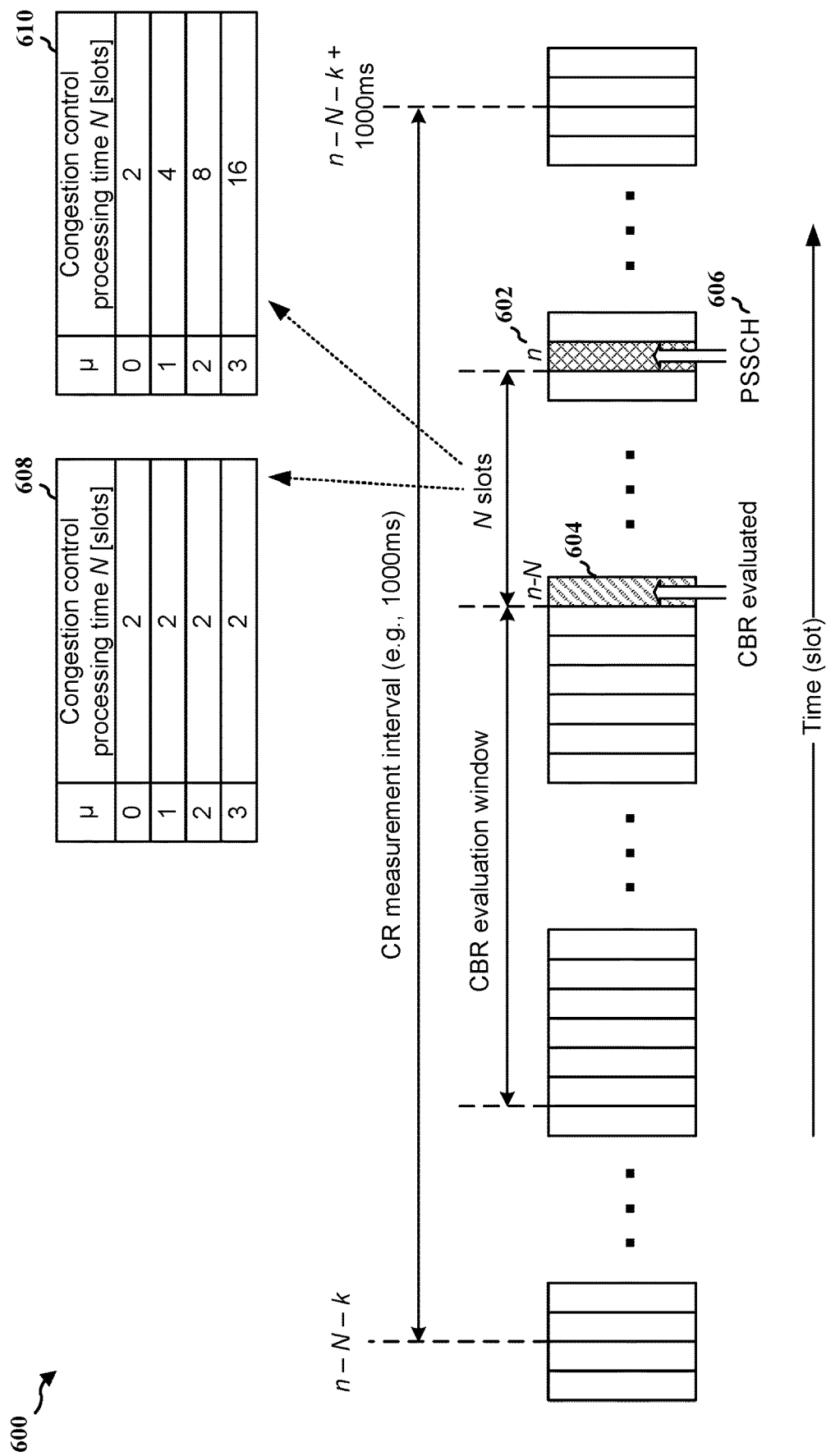
FIG. 6 is a diagram illustrating an example of evaluating the CR limit at a UE.

FIG. 6 is a diagram 600 illustrating an example of evaluating the CR limit at a UE. The UE may be configured with a sidelink channel occupancy ratio (CR) limit (e.g., through a higher layer parameter sl-CR-Limit) and the UE may also be configured to transmit a PSSCH 606 in slot n 602. Under such a configuration, the UE may apply limits for any priority value k based on the formula:

$$\Sigma_{i \ge k} CR(i) \le CR_{Limit}(k),$$

where the parameter CR(i) is the CR evaluated in slot n-N 604 (e.g., measured CR) for the PSSCH 606 transmission with a "priority" field in the sidelink control information (SCI) (e.g., SCI transmitted/received within a PSCCH) set to i, and the parameter $CR_{Limit}(k)$ corresponds to the sidelink CR limit (e.g., higher layer parameter sl-CR-Limit) that is associated with a priority value k and a channel busy ratio (CBR) range which includes the CBR measured in slot n-N, where N is the congestion control processing time. In other words, the CR limit may be mapped from the CBR, where the CBR may indicate the congestion of the channel at a measured moment. Based on the CR limit, the UE may determine whether to access or use the channel for transmission. For example, when the measured CR is less than or equal to the sidelink CR limit, the UE may transmit data (e.g., a MAC PDU) in the sidelink. Conversely, when the measured CR is higher than the sidelink CR limit, the UE may not transmit data in the sidelink. The congestion control processing time N may be determined based on a numerology μ (e.g., a subcarrier spacing of sidelink), such as shown by the tables 608 and 610 within FIG. 6, and may also be determined based on the UE processing capability. The UE may apply a single processing time capability in the sidelink congestion control.

A sidelink CR (SL CR) evaluated at slot n may be defined as the total number of sub-channels used for its transmissions in slots [n−a, n−1] and granted in slots [n, n+b] divided by the total number of configured sub-channels in the transmission pool over [n−a, n+b]. In other words, when the UE is scheduled to transmit on slot n, the UE may determine the CR by looking at prior transmissions within a time interval (e.g., a lookback window n−a to n−1) and current/future granted transmissions within another time interval (e.g., a lookforward window n to n+b). For example, the lookback window may indicate how many packets (e.g., transmissions) the UE has transmitted, and the lookforward window may indicate how many packets have been scheduled for transmission. The parameter a may be a positive integer and the parameter b may be 0 or a positive integer. In one configuration, the values of parameters a and b may be determined by a UE implementation with a+b+1=1000 or $1000 \cdot 2^\mu$ slots, according to a higher layer parameter for the CR window size (e.g., timeWindowSize-CR), b<(a+b+1)/2, and n+b may not exceed the last transmission opportunity of the grant for the current transmission. As described in connection with FIG. 6, for a UE to transmit on the sidelink, the total number of transmissions within the lookback window and the lookforward window may not exceed the CR limit, where the CR limit may be determined based on the CBR. Optionally or additionally, the SL CR may be evaluated for each transmission and/or each retransmission, and/or it may be computed per priority level. Also, in evaluating the SL CR, the UE may assume the transmission parameter or setting used at slot n is reused according to the existing grant(s) in slot [n+1, n+b] without packet dropping. The slot index used for evaluating the SL CR may be based on the physical slot index. In one example, the CR range may be 0:0.0001:1, where 1 may indicate that the UE is transmitting on all the resources within a CR window and 0 may indicate that the UE has no transmission in the lookback window and the UE also has no transmission scheduled for the lookforward window. In other words, the CR may be a value between 0 and 1, and the value may indicate the number of sub-channels the UE occupied in the lookback window and scheduled for the lookforward window over the total number of sub-channels.

A sidelink CBR (SL CBR) measured in slot n may be defined as the portion of sub-channels in the resource pool whose SL received signal strength indicator (SL RSSI) measured by the UE exceeds a (pre-)configured threshold sensed over a CBR measurement window [n−a, n−1] (e.g., the lookback window), where a may be equal to 100 or 100·2$^\mu$ slots, according to a higher layer parameter for the CBR window size (e.g., timeWindowSize-CBR). The slot index may be based on the physical slot index. Also, the CBR range may be 0:0.01:1, where 1 may indicate that the medium (e.g., all sub-channels) is fully occupied and 0 may indicate that the medium is free (e.g., no sub-channel is occupied), from a measuring UE's perspective. In other words, the CBR may indicate the ratio of the time and frequency resource (e.g., number of sub-channels) when the channel is perceived by the UE as busy to all time and frequency resource (e.g., total number of sub-channels) in the monitoring interval (e.g., within the lookback window).

The SL RSSI may be defined as the linear average of the total received power (in watts (W)) observed in the configured sub-channel in OFDM symbols of a slot configured for PSCCH and PSSCH, starting from the 2$^{nd}$ OFDM symbol. In other words, to measure the RSSI in a sub-channel, the UE may consider all the OFDM symbols with the slots of the sub-channel. In one configuration, for frequency range 1 (FR1), the reference point for the SL RSSI may be the antenna connector of the UE. For frequency range 2 (FR2), the SL RSSI may be measured based on the combined signal from antenna elements corresponding to a given receiver branch. For FR1 and FR2, if a receiver diversity is in use (e.g., implemented at or configured for) by the UE, the SL RSSI value reported by the UE may not be lower than the corresponding SL RSSI of any of the individual receiver branches. In other words, if a channel is measured by multiple receiver branches, the UE may report the largest RSSI measured among the receiver branches. For example, referring back to FIG. 5, the truck in FIG. 5 (e.g., UE 504 on the left) may have four receiver branches (e.g., TRP 512, TRP 514, TRPs 516, etc.), where each receiver branch (e.g., TRP) may perform its own RSSI measurement for a channel. As each receiver branch may experience a different channel condition, the measured RSSIs from different TRPs may be different for the channel. For example, the RSSI measured by the front TRP 512 may be −40 decibel-milliwatts (dBm), the RSSI measured by the rear TRP 514 may be −60 dBm, and the TRP measured by the side TRPs 516 may be −45 dBm, etc. In reporting the measured RSSI, the UE may report the largest RSSI measured, such as the −40 dBm RSSI measured by the front TRP 512, and the UE may not report any measured RSSI that is lower than the corresponding RSSI of any individual receiver branches (e.g., the −45 dBm from the side TRPs 516 and/or the −60 dBm from the rear TRP 514).

FIG. 7 is a diagram 700 illustrating an example for CBR and CR configuration in accordance with aspects of the present disclosure, where a UE may determine whether it may transmit data within a timeframe based at least in part on the CBR measured, the CR limit and/or the priority of the data to be transmitted, etc. The CR limit associated with the CBR measured and/or the priority of data may be pre-defined and/or configured for the UE. For example, the UE may determine whether it may transmit a packet with priority Z on a sub-channel by measuring the CR and the CBR of the sub-channel (e.g., based on RSSI). If the measured CBR is 0.5, the UE may determine that the CR limit is 0.02 (e.g., based on the priority Z at row 702 and the CBR range at column 704). Thus, if the measured CR is above 0.02 (i.e., the CR limit), the UE may not transmit the packet on the sub-channel, whereas if the measured CR is below the 0.02, the UE may transmit the packet on the sub-channel. The priority of a data may be determined based on one or more factors, such as the transmission mode, transmission scheme, pre-defined rule, etc. As shown by FIG. 7, as the value for the CBR measured increases, the corresponding value for the CR limit may be decreased. This means that if the UE observes a medium (e.g., a sub-channel) is crowded (e.g., a high CBR), the number of times the UE may transmit on the sub-channel may be reduced (e.g., a low CR limit). The CR limit may also vary based on the priority level of the data packet to be transmitted. For example, if priority X is higher than priority Y and priority Z, the CR limits associated with priority X may be higher than the CR limits associated with priority Y and priority Z.

Figure 8:
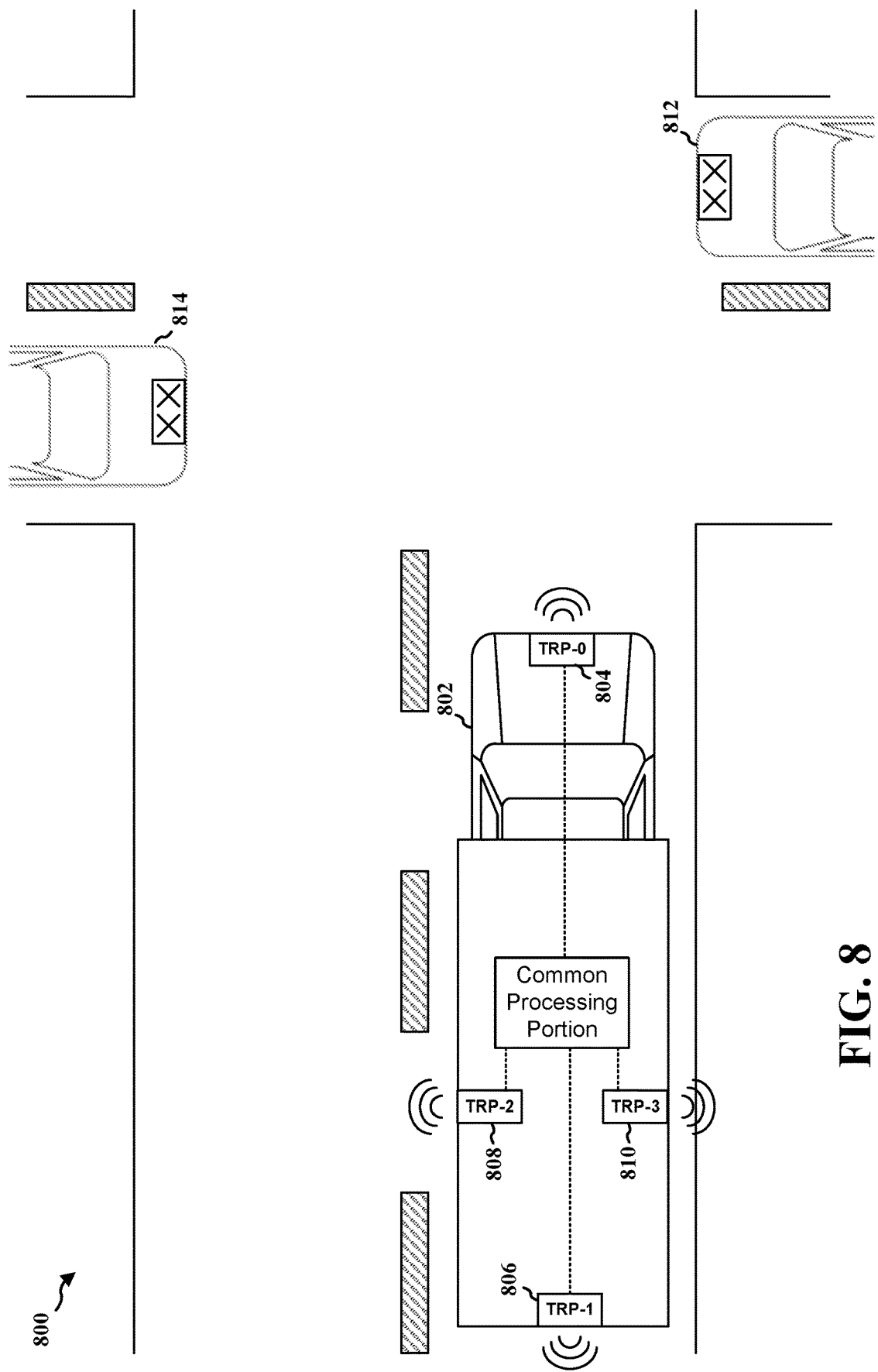
FIG. 8 is a diagram illustrating an example of receiver diversity.

As discussed previously, in some congestion control mechanisms, a UE may determine the CBR of a sidelink sub-channel by measuring the SL RSSI of the sidelink sub-channel. If the UE has multiple TRPs (e.g., a mTRP UE) and a receiver diversity is in use by the UE, the SL RSSI value reported by the UE (e.g., for determining the CBR) may not be lower than the corresponding SL RSSI of any of the individual TRPs (e.g., receiver branches). For example, as shown by diagram 800 of FIG. 8, a mTRP UE 802 may include four TRPs 804, 806, 808, 810 (corresponding to TRP-0, TRP-1, TRP-2, and TRP-3, respectively), where each of the four TRPs may perform its RSSI measurement for a sidelink channel. In reporting the measured RSSI, the UE may report the largest RSSI measured, and the UE may not report any measured RSSI that is lower than the corresponding RSSI of any individual TRP. In other words, for the mTRP UE 802, the SL RSSI reported for CBR measurement may be the larger value among the measured RSSIs from the multiple TRPs (e.g., TRPs 804, 806, 808, 810) if such a SL RSSI measurement approach is used for the congestion control mechanism.

Such congestion control mechanisms may be sub-optimal for mTRP UEs because the reported RSSI (e.g., the largest RSSI measured) from multiple TRPs may not reflect the RSSI measured/observed by each individual TRP. For example, referring back to FIG. 8, the mTRP UE 802 with a front mounted TRP 804 and a back mounted TRP 806 may approach an intersection. As there may be more traffic or interference in front of the mTRP UE 802 (e.g., from UEs 812, 814), the CBR measured from the front TRP 804 may be higher than the CBR measured from the back TRP 806. As the CBR measurement under this congestion control mechanism utilizes the worst CBR (e.g., CBR from the front TRP 804), the congestion control based on this CBR may limit resource usage, MCS, and/or maximum transmit power for the mTRP UE 802. For example, other TRPs within the mTRP UE 802, such as the back TRP 806, may observe a permissible sidelink traffic for transmission, but the mTRP UE 802 may be refrained from making the transmission because one of its TRPs (e.g., front TRP 804) observes the sidelink traffic as impermissible for transmission (e.g., the measured CR is above the CR limit).

Aspects presented herein may provide an improved congestion control mechanism for UEs with multiple TRPs (e.g., mTRP UEs). Aspects presented herein may optimize SL RSSI measurement, CBR measurement, CR evaluation and/or congestion control mechanism for mTRP UEs. In one aspect, control procedures for a mTRP UE are proposed, where the mTRP UE may measure the RSSI of a sidelink channel, the mTRP UE may measure the CBR based on the RSSI, and the mTRP UE may determine the CR limit based on the measured CBR. Then the mTRP UE may determine whether the total number of transmissions within a CR evaluation window exceeds the determined CR limit, if the UE is to make a transmission decision for congestion control (e.g., transmit if CR limit is not reached, and not transmit if CR limit is reached). In another aspect, the CR evaluation for a mTRP UE may be performed per TRP, where, for congestion control purposes, the mTRP UE may make a transmission decision by taking into account the per TRP CR evaluation. For example, the mTRP UE may perform the SL RSSI measurement per TRP, the mTRP UE may measure the CBR of each TRP based on their corresponding RSSI measurements, and the mTRP UE may determine the CR limit for each TRP (e.g., different CR limits for different TRPs) and/or determine the CR limit based at least in part on multiple CBR measurements from multiple TRPs (e.g., may be based on the maximum/minimum CBR measured, the average CBR, the median CBR, etc.). In other words, the congestion control criteria considered by the mTRP UE may take into account the per TRP CR evaluation. This may provide a finer granularity for the congestion control.

FIG. 9 is a diagram 900 illustrating an example of a transmission decision for congestion control based on the CBR and the CR limit per TRP according to aspects of the present disclosure. At 902A, a UE 904 may measure the SL RSSI for each TRP, where the UE 904 may generate MSL RSSI measurements for a sub-channel if it has MTRPs. For example, as the UE 904 has 4 TRPs 906, 908, 910, 912, the UE 904 may generate 4 SL RSSI measurements for a sub-channel for the 4 TRPs (e.g., one SL RSSI measurement per TRP). At 902B, the UE 904 may measure the CBR for each TRP in a CBR measurement window, where the UE 904 may generate M CBR measurements in the CBR window if it has MTRPs. For example, the UE 904 may generate 4 CBR measurements for the four TRPs (e.g., one CBR measurement per TRP). At 902C, the UE 904 may determine the CR limits based on the measured CBRs, such as through a pre-configured/defined rule (e.g., a table) and/or value, as described in connection with FIG. 7. As the CBR-to-CR limit mapping is per TRP, the UE 904 may determine a CR limit for each TRP, based on the CBR measured for that TRP. For example, the UE 904 may determine a CR limit for TRP 906 based on the CBR measurement on the TRP 906, and the UE 904 may also determine CR limits for TRPs 908, 910, 912 based on their CBR measurements. At 902D, the UE 904 may evaluate the CR of each TRP within multiple TRPs for the congestion control, such that the CR evaluated for different TRPs may be different. Thus, if the UE 904 is to make a transmission decision for the congestion control, the UE 904 may determine whether the per TRP CR evaluated within the CR evaluation window exceeds a CR limit for that TRP. For example, if the UE 904 is to determine whether to transmit using TRP 906, the UE 904 may determine whether the CR evaluated at TRP 906 exceeds the CR limit (e.g., obtained at 902C). If the CR evaluated is below the CR limit, the UE 904 may transmit data using TRP 906. If the CR evaluated is not below the CR limit, the UE 904 may not transmit data using TRP 906. At 902E, the UE 904 may transmit data on one or more TRPs whose evaluated CR have not exceeded the CR limit. As the evaluated CR may be different for different TRPs, among TRPs whose evaluated CR have not exceed the CR limit, the UE 904 may transmit using one of these TRPs (i.e., other TRPs may be turned off), or the UE 904 may transmit using more than one of these TRPs. For example, if the evaluated CR for TRPs 906, 908, 910 are below the CR limit, the UE 904 may transmit on one of them (e.g., TRP 906) with others turned off (e.g., TRPs 908, 910, 912), or the UE 904 may transmit on more than one TRPs (e.g., TRPs 906, 908), etc. In other words, the transmission decision may be made per TRP. For example, for the intended transmission(s) over m-th TRP (1≤m≤M), the UE 904 may ensure the following limits are met for a priority value k:

$$\Sigma_{i\geq k}CR^{(m)}(i) \leq CR_{Limit}^{(m)}(k).$$

Note that the use of "A" "B" "C" and "D" in figures and descriptions does not specify a particular temporal order and merely indicates different parts of a process or method.

Figure 10:
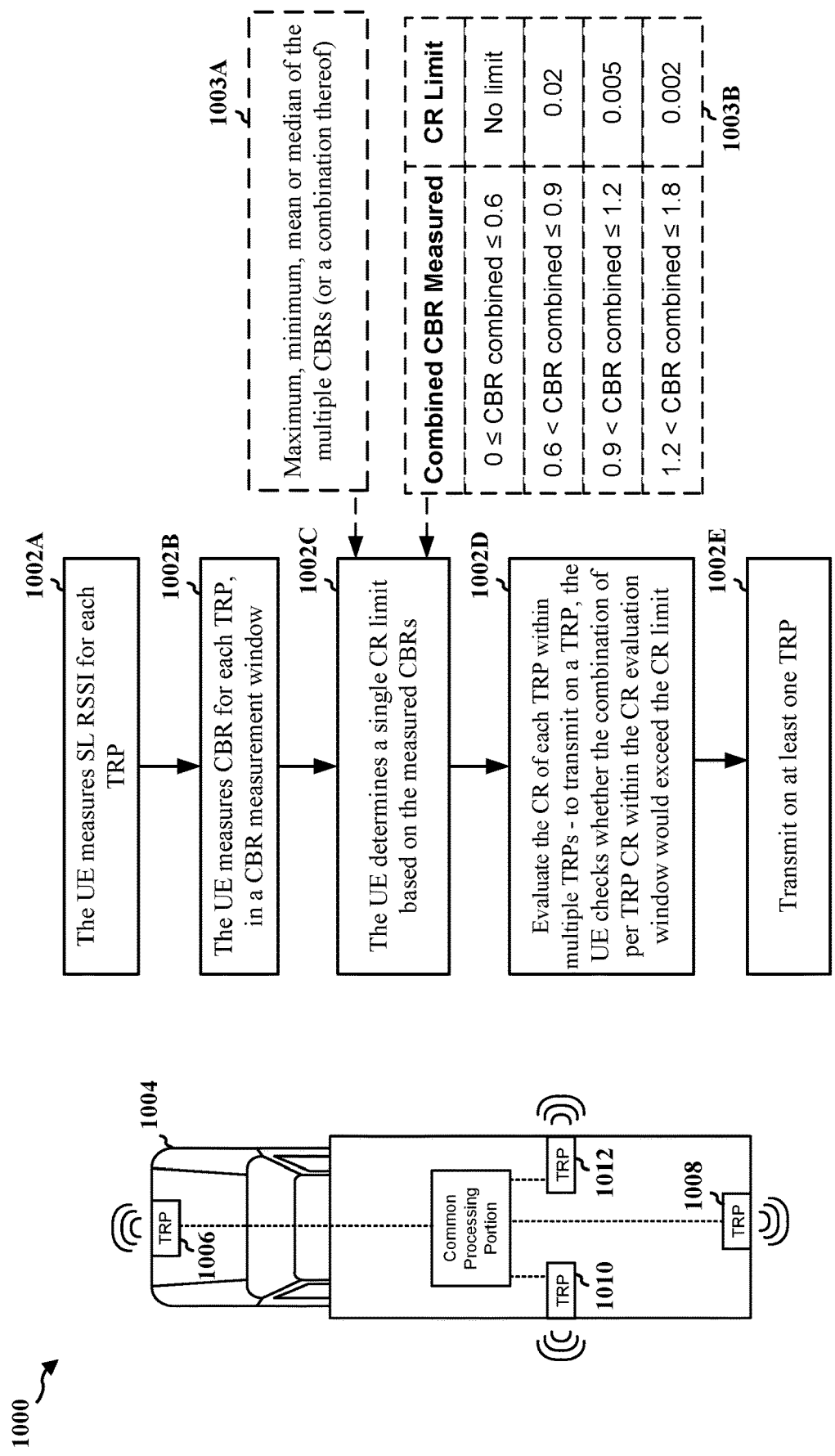
FIG. 10 is a diagram illustrating an example of making a transmission decision for congestion control.

FIG. 10 is a diagram 1000 illustrating an example of a transmission decision for congestion control based on the CBR per TRP but with a single CR limit according to aspects of the present disclosure. At 1002A, a UE 1004 may measure the SL RSSI for each TRP, where the UE 1004 may generate M SL RSSI measurements for a sub-channel if it has M TRPs. For example, as the UE 1004 has 4 TRPs 1006, 1008, 1010, 1012, the UE 1004 may generate 4 SL RSSI measurements for a sub-channel for the 4 TRPs (e.g., one SL RSSI measurement per TRP). At 1002B, the UE 1004 may measure the CBR for each TRP in a CBR measurement window, where the UE 1004 may generate M CBR measurements in the CBR window if it has M TRPs. For example, the UE 1004 may generate four CBR measurements for the four TRPs (e.g., one CBR measurement per TRP). At 1002C, the UE 1004 may determine a single CR limit based on the measured CBRs. In other words, a single CR limit may be mapped from multiple CBRs. In one configuration, for mapping multiple CBRs to a single CR limit, as shown at 1003A, the mapping may be based on the maximum, minimum, mean or median of the multiple CBRs, or a combination thereof (e.g., a mean of two maximum CBRs, a median of three highest CBRs, etc.). In another configuration, as shown at 1003B, the mapping may be based on a pre-configured rule (e.g., a table), which maps multiple CBR values or a combined CBR value to a single CR limit. At 1002D, the UE 1004 may evaluate the CR of each TRP within multiple TRPs for the congestion control, such that the CR evaluated for different TRPs may be different. Thus, if the UE 1004 is to make a transmission decision for the congestion control, the UE 1004 may determine whether the combination of a per TRP CR within the CR evaluation window exceeds the CR limit. For example, for the intended transmission(s) on one or multiple TRPs, the UE 1004 may ensure the following limits are met for a priority value k:

$$\Sigma_{1\leq m\leq M}\Sigma_{i\geq k}CR^{(m)}(i) \leq CR_{Limit}(k).$$

Note that the transmission on each TRP may be treated as separate transmissions, but the total number of transmissions in the CR evaluation window may be subject to a single CR limit. For example, if the UE 1004 is to transmit using one or more TRPs (e.g., TRPs 1006, 1008, 1010, 1012), the UE 1004 may combine the CR evaluated at each TRP within the CR evaluation window, and may compare the combined CR to the CR limit to determine whether to transmit using one or more TRPs. If the combined CR does not exceed the CR limit, the UE 1004 may transmit on one or more TRPs. However, if the combined CR exceeds the CR limit, the UE 1004 may not transmit on any TRP. At 1002E, the UE 1004 may transmit data on at least one of the multiple TRPs. In some transmission occasions, the UE 1004 may transmit using a single TRP (i.e., other TRPs may be turned off), such as using TRP 1006 for transmission (TRPs 1008, 1010, 1012 are turned off). In other transmission occasions, the UE 1004 may transmit using multiple TRPs. Note that the use of "A" "B" "C" and "D" in figures and descriptions does not specify a particular temporal order and merely indicates different parts of a process or method.

Figure 11:
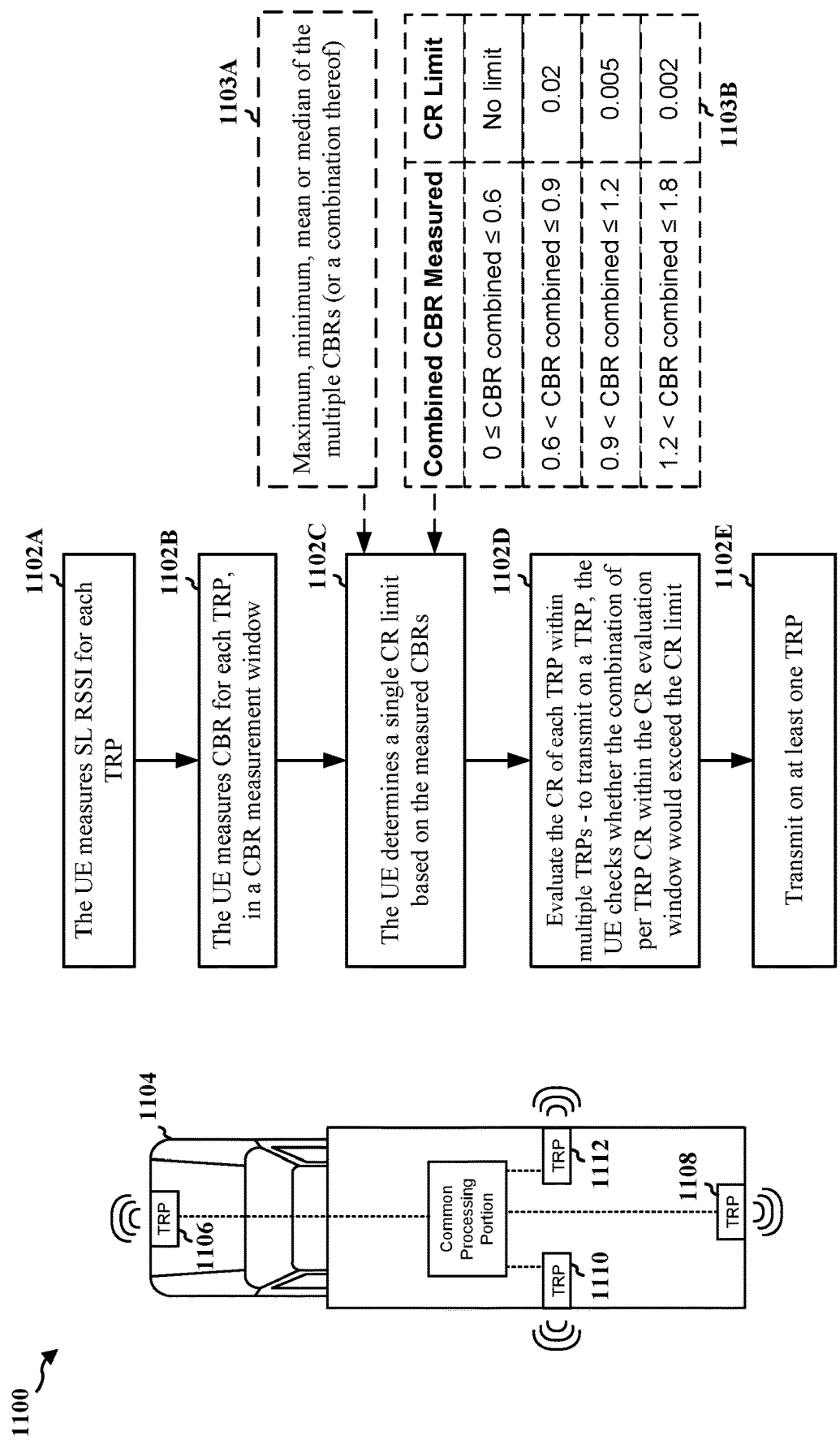
FIG. 11 is a diagram illustrating an example of making a transmission decision for congestion control.

FIG. 11 is a diagram 1100 illustrating an example of a transmission decision for congestion control based on the CBR per TRP and with a single CR limit, but also with per TRP congestion control according to aspects of the present disclosure. At 1102A, a UE 1104 may measure the SL RSSI for each TRP, where the UE 1104 may generate M SL RSSI measurements for a sub-channel if it has M TRPs. For example, as the UE 1104 has 4 TRPs 1106, 1108, 1110, 1112, the UE 1104 may generate 4 SL RSSI measurements for a sub-channel for the 4 TRPs (e.g., one SL RSSI measurement per TRP). At 1102B, the UE 1104 may measure the CBR for each TRP in a CBR measurement window, where the UE 1104 may generate MCBR measurements in the CBR window if it has M TRPs. For example, the UE 1104 may generate four CBR measurements for the four TRPs (e.g., one CBR measurement per TRP). At 1102C, the UE 1104 may determine a single CR limit based on the measured CBRs. In other words, a single CR limit may be mapped from multiple CBRs. In one configuration, for mapping multiple CBRs to a single CR limit, as shown at 1103A, the mapping may be based on the maximum, minimum, mean or median of the multiple CBRs, or a combination thereof (e.g., a mean of two maximum CBRs, a median of three highest CBRs, etc.). In another configuration, as shown at 1103B, the mapping may be based on a pre-configured rule (e.g., a table), which maps multiple CBR values or a combined CBR value to a single CR limit. At 1102D, the UE 1104 may evaluate the CR of each TRP within multiple TRPs for the congestion control, such that the CR evaluated for different TRPs may be different. Thus, if the UE 1104 is to make a transmission decision for the congestion control, the UE 1104 may determine whether the per TRP CR or the combination of per TRP CR within the CR evaluation window exceeds the CR limit. For example, for the intended transmission(s) on one or multiple TRPs, the UE 1104 may ensure the following limits are met for a priority value k, for a specific TRP m (1≤m≤M):

$$\Sigma_{i\geq k} CR^{(m)}(i) \leq CR_{Limit}(k).$$

Note that the transmission on each TRP may be treated as separate transmissions, and the total number of transmissions in the CR evaluation window per TRP may be subject to a single CR limit. At 1102E, the UE 1104 may transmit data on at least one of the multiple TRPs. In some transmission occasions, the UE 1104 may transmit using a single TRP (i.e., other TRPs may be turned off), such as using TRP 1106 for a transmission (TRPs 1108, 1110, 1112 are turned off). In other transmission occasions, the UE 1104 may transmit using multiple TRPs, such as using all TRPs or TRPs with a CR evaluated below the CR limits. As such, the per TRP CR evaluation may allow transmissions over a specific TRP if the CR limit for that TRP has not been reached, although a CR limit on other TRPs may have been reached. For example, the CR evaluated at TRPs 1110 and 1112 may have exceed the CR limit (e.g., obtained at 1102C), whereas the CR evaluated at TRPs 1106 and 1108 may have not exceed the CR limit. Thus, the UE 1104 may still transmit on one of or both TRPs 1106 and 1108. Note that the use of "A" "B" "C" and "D" in figures and descriptions does not specify a particular temporal order and merely indicates different parts of a process or method.

Figure 12:
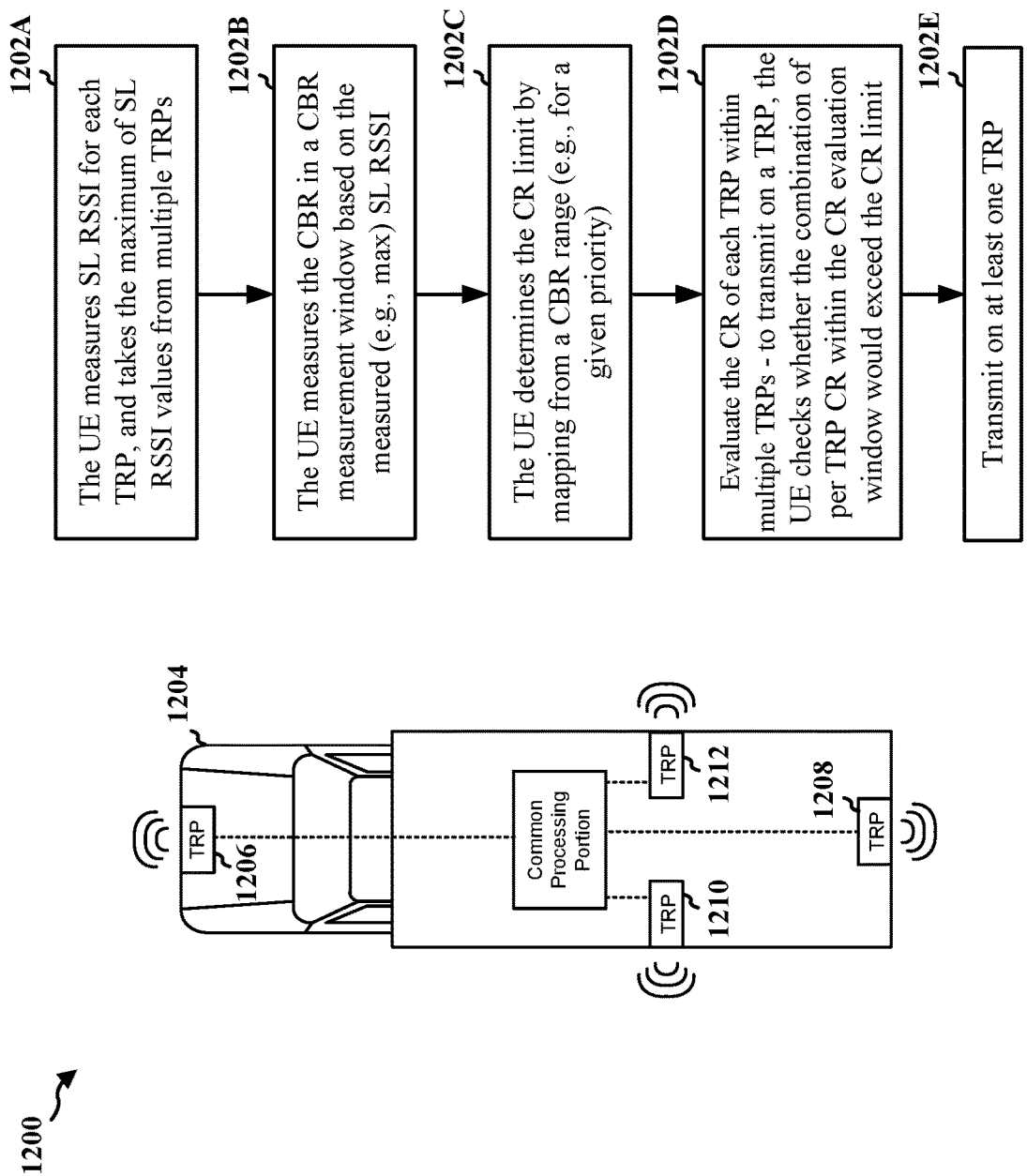
FIG. 12 is a diagram illustrating an example of making a transmission decision for congestion control.

FIG. 12 is a diagram 1200 illustrating an example of a transmission decision for congestion control based on the CR evaluation per TRP according to aspects of the present disclosure. At 1202A, a UE 1204 may measure the SL RSSI for multiple TRPs (e.g., TRPs 1206, 1208, 1210, 1212), and the UE 1204 may utilize the maximum of SL RSSI values from the multiple TRPs. In other words, when measuring the SL RSSI, the UE 1204 may utilize the maximum of RSSI values from multiple TRPs. For example, the UE 1204 may measure the SL RSSI for TRPs 1206, 1208, 1210, 1212. If the TRP 1206 yields the highest SL RSSI value, the UE 1204 may use the value for the CBR determination. At 1202B, the UE 1204 may measure the CBR in a CBR measurement window based on the measured (e.g., highest) SL RSSI (e.g., single CBR though multiple TRPs). At 1202C, the UE 1204 may determine the CR limit based on the measured CBR. For example, as described in connection with FIG. 7, for a given priority, the CR limit may be mapped from a CBR range. At 1202D, the UE 1204 may evaluate the CR of each TRP within multiple TRPs for the congestion control, such that the CR evaluated for different TRPs may be different. Thus, if the UE 1204 is to make a transmission decision for the congestion control, the UE 1204 may determine whether the combination of per TRP CR within the CR evaluation window exceeds the CR limit. For example, for the intended transmission(s) on one or multiple TRPs, the UE 1204 may ensure the following limits are met for a priority value k:

$$\Sigma_{1\leq m\leq M}\Sigma_{i\geq k} CR^{(m)}(i) \leq CR_{Limit}(k).$$

Note that the transmission on each TRP may be treated as separate transmissions, and the total number of transmissions in the CR evaluation window may be subject to a single CR limit. For example, if the UE 1204 is to transmit using one or more TRPs (e.g., TRPs 1206, 1208, 1210, 1212), the UE 1204 may combine the CR evaluated at each TRP within the CR evaluation window, and may compare the combined CR to the CR limit to determine whether to transmit using one or more TRPs. If the combined CR does not exceed the CR limit, the UE may transmit on one or more TRPs. However, if the combined CR exceeds the CR limit, the UE may not transmit on any TRP. At 1202E, the UE 1204 may transmit data on at least one of the multiple TRPs. In some transmission occasions, the UE 1204 may transmit using a single TRP (i.e., other TRPs may be turned off), such as using TRP 1206 for transmission (TRPs 1208, 1210, 1212 are turned off). In other transmission occasions, the UE 1204 may transmit using multiple TRPs. Note that the use of "A" "B" "C" and "D" in figures and descriptions does not specify a particular temporal order and merely indicates different parts of a process or method.

Figure 13:
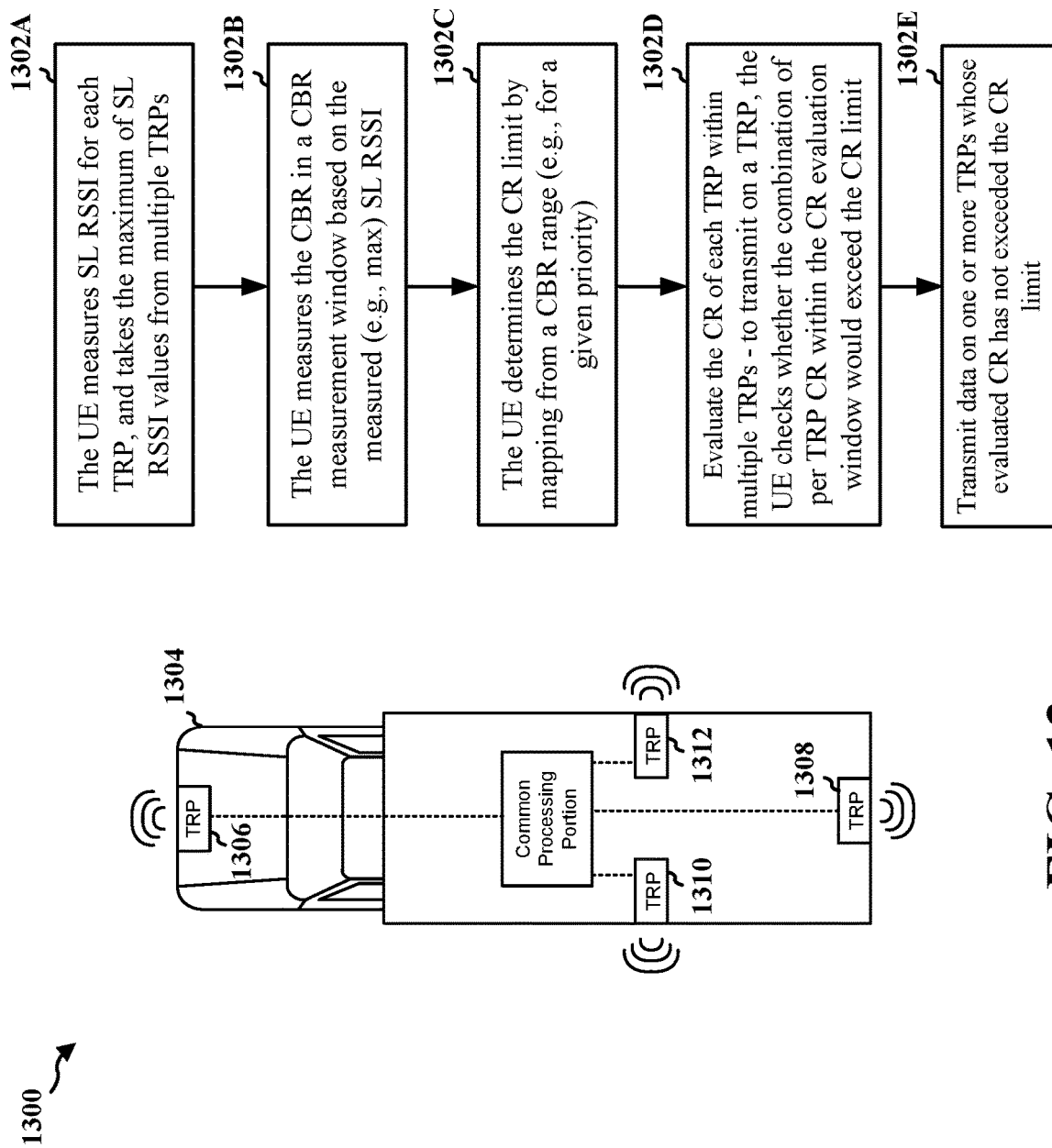
FIG. 13 is a diagram illustrating an example of making a transmission decision for congestion control.

FIG. 13 is a diagram 1300 illustrating an example of a transmission decision for congestion control based on the CR evaluation and the CR limit per TRP according to aspects of the present disclosure. At 1302A, a UE 1304 may measure the SL RSSI for multiple TRPs (e.g., TRPs 1306, 1308, 1310, 1312), and the UE 1304 may utilize the maximum of SL RSSI values from the multiple TRPs. In other words, when measuring the SL RSSI, the UE 1304 may utilize the maximum of RSSI values from multiple TRPs. For example, the UE 1304 may measure the SL RSSI for TRPs 1306, 1308, 1310, 1312. If the TRP 1306 yields the highest SL RSSI value, the UE 1304 may use the value for the CBR determination. At 1302B, the UE 1304 may measure the CBR in a CBR measurement window based on the measured (e.g., highest) SL RSSI (e.g., single CBR though multiple TRPs). At 1302C, the UE 1304 may determine the CR limit based on the measured CBR. For example, as described in connection with FIG. 7, for a given priority, the CR limit may be mapped from a CBR range. At 1302D, the UE 1304 may evaluate the CR of each TRP within multiple TRPs for the congestion control, such that the CR evaluated for different TRPs may be different. Thus, if the UE 1304 is to make a transmission decision for the congestion control, the UE 1304 may determine whether the per TRP CR or the combination of per TRP CR within the CR evaluation window exceeds the CR limit.

For example, for the intended transmission(s) on one or multiple TRPs, the UE 1304 may ensure the following limits are met for a priority value k, for TRP m (1≤m≤M):

$$\Sigma_{i=k} CR^{(m)}(i) \leq CR_{Limit}(k).$$

Note that the transmission on each TRP may be treated as separate transmissions, and the total number of transmissions in the CR evaluation window on the TRP may be subject to a single CR limit. At 1302E, the UE 1304 may transmit data on one or more TRPs whose evaluated CR have not exceeded the CR limit. As the evaluated CR may be different for different TRPs, among TRPs whose evaluated CR have not exceed the CR limit, the UE 1304 may transmit using one of these TRPs (i.e., other TRPs may be turned off), or the UE 1304 may transmit using more than one of these TRPs. For example, if the evaluated CR for TRPs 1306, 1308, 1310 are below the CR limit, the UE 1304 may transmit on one of them (e.g., TRP 1306) with others turned off (e.g., TRPs 1308, 1310, 1312), or the UE 1304 may transmit on more than one TRPs (e.g., TRPs 1306, 1308), etc. As such, the per TRP CR evaluation may allow transmission over a specific TRP if the CR limit for that TRP has not been reached, although a CR limit on other TRPs may have been reached. Note that the use of "A" "B" "C" and "D" in figures and descriptions does not specify a particular temporal order and merely indicates different parts of a process or method.

In one aspect of the present disclosure, the per TRP CR evaluation may consider an integer number of transmissions. For example, for a UE with MTRPs (e.g., UE 1304 with 4 TRPs 1306, 1308, 1310, 1312), if the UE is transmitting on one TRP (e.g., one of the TRPs), this transmission may be counted as one transmission for that TRP. Thus, if the UE is transmitting using all MTRPs, this transmission may be counted as M transmissions in total (one transmission for each TRP).

In another aspect of the present disclosure, the per TRP CR evaluation may consider a fractional number of transmissions. In one example, the total number of transmissions (e.g., for the CR evaluation) may be determined based on per TRP ON/OFF, such as based on one or more TRPs used for a transmission (e.g., on the ON condition) and the total number of TRPs. If a UE has M TRPs and the UE is transmitting only on one TRP, this transmission may be counted as 1/M transmissions for that transmission. Thus, if the UE is transmitting on all TRPs, as each TRP has 1/M transmissions, the total number of transmissions for this transmission is one. For example, if the UE 1304 in FIG. 13 is making a transmission on TRP 1306, the total number of transmissions for this transmission may be counted as a ¼ transmission; and if the UE 1304 is making a transmission on TRPs 1306, 1308, 1310, the total number of transmissions for this transmission may be counted as a ¾ transmission, etc.

In another example, the total number of transmissions (e.g., for the CR evaluation) may be determined based on the power allocation among TRPs. For example, if a UE has two TRPs and the UE is allocating its transmission power equally to the two TRPs (i.e., the UE is transmitting on both TRPs), this transmission may be counted as ½ transmission for each of the two TRPs, respectively, and the total transmission number may be counted as one for this transmission. On the other hand, if the UE is allocating ⅓ of its transmission power to TRP-0 and ⅔ of its transmission power to TRP-1, the transmission may be counted as ⅓ transmission for TRP-0 and ⅔ transmission for TRP-1, and the total transmission number may also be counted as one for this transmission.

Figure 14:
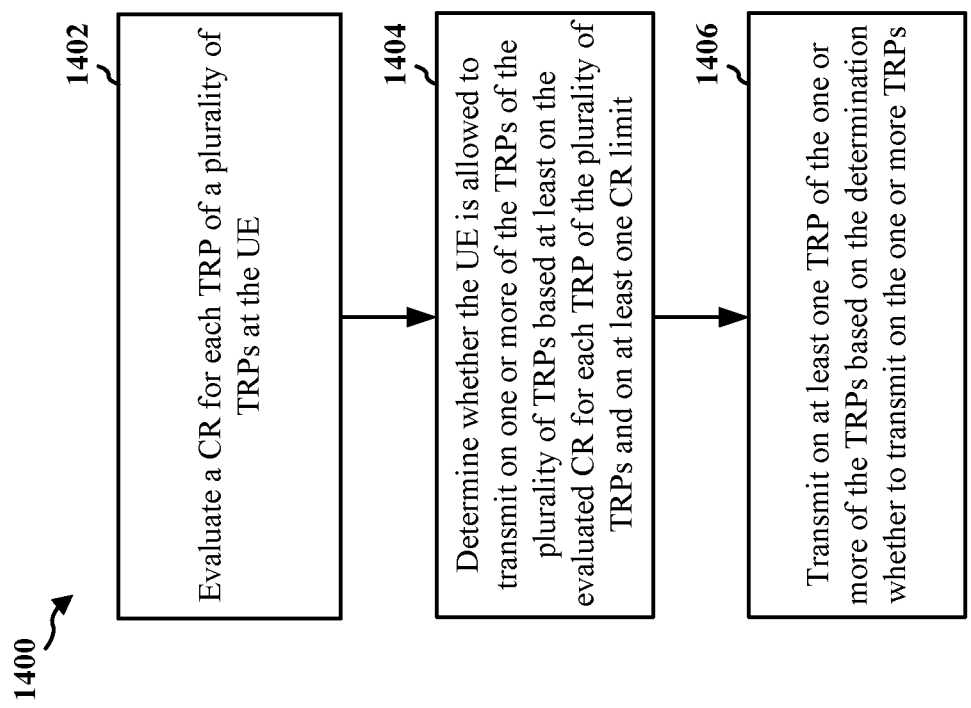
FIG. 14 is a flowchart of a method of wireless communication.

FIG. 14 is a flowchart of a method 1400 of wireless communication. The method may be performed by a UE or a component of a UE (e.g., the UE 104, 350, 504, 802, 904, 1004, 1104, 1204, 1304; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to evaluate CR for each TRP, and may enable the UE to make transmission determination for each TRP based on the evaluated CR. The CR for each TRP of the plurality of TRPs may also be determined based on at least one priority value At 1402, the UE may evaluate a CR for each TRP of a plurality of TRPs at the UE, such as described in connection with FIGS. 9-13. For example, at 902D, the UE 904 may evaluate the CR of each TRP within multiple TRPs for the congestion control, such that the CR evaluated for different TRPs may be different.

In one configuration, the plurality of TRPs may comprise M TRPs, and the CR for each TRP of the plurality of TRPs may be determined based on a sum of CRs across at least one priority value, where the sum is increased by 1 for a transmission on the TRP of the plurality of TRPs.

In another configuration, the plurality of TRPs may comprise M TRPs, and the CR for each TRP of the plurality of TRPs may be determined based on a sum of CRs across at least one priority value, where the sum is increased by 1/M for a transmission on the TRP of the plurality of TRPs.

In another configuration, the CR for each TRP of the plurality of TRPs may be determined based on a sum of CRs across at least one priority value, and the CRs may be determined based on a percentage P of power allocated to a corresponding TRP, where the sum is increased by P for a transmission on the TRP of the plurality of TRPs.

At 1404, the UE may determine whether the UE is allowed to transmit on one or more of the TRPs of the plurality of TRPs based at least on the evaluated CR for each TRP of the plurality of TRPs and on at least one CR limit, such as described in connection with FIGS. 9-13. For example, at 902C, the UE 904 may determine the CR limits based on the measured CBRs, and at 902D, if the UE 904 is to make a transmission decision for the congestion control, the UE 904 may determine whether the per TRP CR evaluated within the CR evaluation window exceeds CR limit for that TRP. In addition, the UE may determine a CBR for each TRP of the plurality of TRPs, where the at least one CR limit may be based on the determined CBR for each TRP of the plurality of TRPs. The determination of the CBR for each TRP may also be based on SL RSSI measurements for the TRP within a CBR measurement window.

In one configuration, the UE may determine a CR limit for each TRP of the plurality of TRPs based on the determined CBR for a corresponding TRP, where the at least one CR limit is a plurality of CR limits corresponding to the plurality of TRPs, such as described in connection with FIG. 9. In such configuration, in determining whether the UE is allowed to transmit on one or more of the TRPs of the plurality of TRPs, the UE may determine, for each TRP of the one or more of the TRPs, whether the evaluated CR for the TRP is less than the determined CR limit for the TRP. Then the UE may determine that it is allowed to transmit on the TRP when the evaluated CR for the TRP is less than the determined CR limit for the TRP, such as described in connection with FIG. 9.

In another configuration, the UE may determine one CR limit for the plurality of TRPs based on the determined CBR for each TRP of the plurality of TRPs, where the at least one CR limit is the one CR limit, such as described in connection with FIGS. 10 and 11. In one example, as described in connection with FIG. 10, the one or more TRPs may comprise the plurality of TRPs. In determining whether the UE is allowed to transmit on the plurality of TRPs, the UE may determine whether a sum of the evaluated CRs for the plurality of TRPs is less than the determined one CR limit. Then the UE may determine that it is allowed to transmit on the TRP when the sum of the evaluated CRs for the plurality of TRPs is less than the determined one CR limit. In another example, as described in connection with FIG. 11, in determining whether the UE is allowed to transmit on one or more of the TRPs of the plurality of TRPs, the UE may determine, for each TRP of the one or more of the TRPs, whether the evaluated CR for the TRP is less than the determined one CR limit. Then the UE may determine that it is allowed to transmit on the TRP when the evaluated CR for the TRP is less than the determined one CR limit. In such configuration, the one CR limit may be determined based on one of a maximum, a minimum, a mean, or a median CBR of the determined CBRs for the plurality of TRPs, such as described in connection with 1003A and 1103A of FIGS. 10 and 11. Additionally or alternatively, the one CR limit may be determined based on mapping from a table or a function based on one or more of the determined CBRs of the plurality of TRPs, such as described in connection with 1003B and 1103B of FIGS. 10 and 11.

In another configuration, the UE may determine a CBR for the plurality of TRPs, where the at least one CR limit is based on the determined CBR for the plurality of TRPs, such as described in connection with FIGS. 12 and 13. In such configuration, the determination of the CBR for the plurality of TRPs may be based on a maximum SL RSSI measurements within a CBR measurement window, and the maximum SL RSSI may be determined from among a set of SL RSSIs where each SL RSSI is determined at one TRP of the plurality of TRPs (e.g., as described in connection with 1202A and 1302A). As such, the UE may determine one CR limit for the plurality of TRPs based on the determined CBR for the plurality of TRPs, where the at least one CR limit is the one CR limit. In one example, as described in connection with FIG. 12, the one or more TRPs may comprise the plurality of TRPs, and in determining whether the UE is allowed to transmit on the plurality of TRPs, the UE may determine whether a sum of the evaluated CRs for the plurality of TRPs is less than the determined one CR limit. Then the UE may determine that it is allowed to transmit on the TRP when the sum of the evaluated CRs for the plurality of TRPs is less than the determined one CR limit. In another example, as described in connection with FIG. 13, in determining whether the UE is allowed to transmit on one or more of the TRPs of the plurality of TRPs, the UE may determine, for each TRP of the one or more of the TRPs, whether the evaluated CR for the TRP is less than the determined one CR limit. Then the UE may determine that it is allowed to transmit on the TRP when the evaluated CR for the TRP is less than the determined one CR limit.

At 1406, the UE may transmit on at least one TRP of the one or more of the TRPs based on the determination whether to transmit on the one or more TRPs, such as described in connection with FIGS. 9-13. For example, at 902E, the UE 904 may transmit data on at least one of the multiple TRPs.

Figure 15:
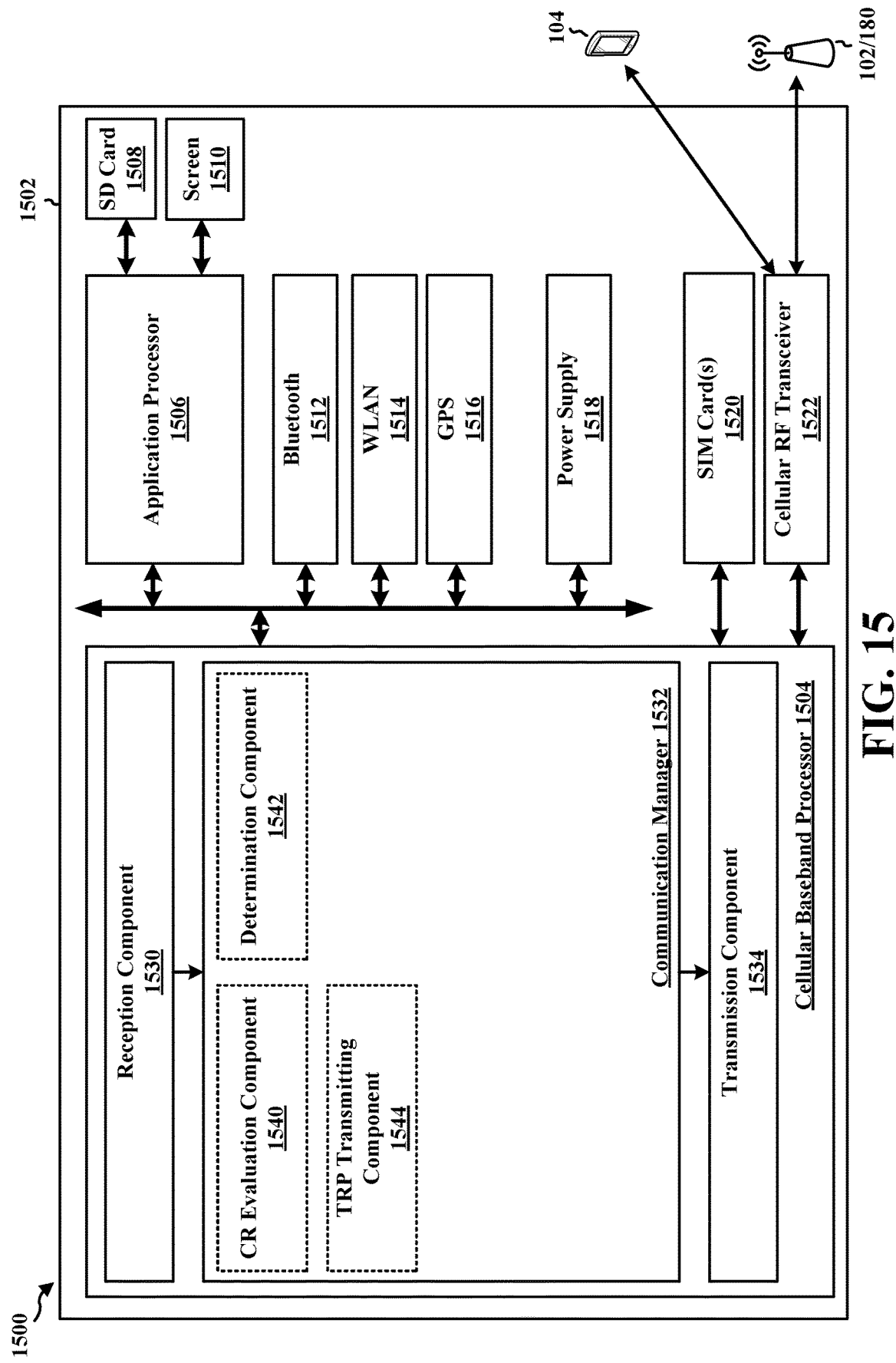
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a CR evaluation component 1540 that is configured to evaluate a CR for each TRP of a plurality of TRPs at the UE, e.g., as described in connection with 1402 of FIG. 14. The communication manager 1532 further includes a determination component 1542 that is configured to determine whether the UE is allowed to transmit on one or more of the TRPs of the plurality of TRPs based at least on the evaluated CR for each TRP of the plurality of TRPs and on at least one CR limit, e.g., as described in connection with 1404 of FIG. 14. The communication manager 1532 further includes a TRP transmitting component 1544 that is configured to transmit on at least one TRP of the one or more of the TRPs based on the determination whether to transmit on the one or more TRPs, e.g., as described in connection with 1406 of FIG. 14.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 1502, and in particular the cellular baseband processor 1504, includes means for evaluating a CR for each TRP of a plurality of TRPs at the UE. The apparatus 1502 includes means for determining whether the UE is allowed to transmit on one or more of the TRPs of the plurality of TRPs based at least on the evaluated CR for each TRP of the plurality of TRPs and on at least one CR limit. The apparatus 1502 includes means for transmitting on at least one TRP of the one or more of the TRPs based on the determination whether to transmit on the one or more TRPs.

In one configuration, the plurality of TRPs may comprise M TRPs, and the CR for each TRP of the plurality of TRPs may be determined based on a sum of CRs across at least one priority value, where the sum is increased by 1 for a transmission on the TRP of the plurality of TRPs. In another configuration, the plurality of TRPs may comprise M TRPs, and the CR for each TRP of the plurality of TRPs may be determined based on a sum of CRs across at least one priority value, where the sum is increased by 1/M for a transmission on the TRP of the plurality of TRPs. In another configuration, the CR for each TRP of the plurality of TRPs may be determined based on a sum of CRs across at least one priority value, and the CRs may be determined based on a percentage P of power allocated to a corresponding TRP, where the sum is increased by P for a transmission on the TRP of the plurality of TRPs.

The apparatus 1502 includes means for determining a CBR for each TRP of the plurality of TRPs, where the at least one CR limit may be based on the determined CBR for each TRP of the plurality of TRPs. The determination of the CBR for each TRP may also be based on SL RSSI measurements for the TRP within a CBR measurement window.

In one configuration, the apparatus 1502 includes means for determining a CR limit for each TRP of the plurality of TRPs based on the determined CBR for a corresponding TRP, where the at least one CR limit is a plurality of CR limits corresponding to the plurality of TRPs. In such configuration, in determining whether the UE is allowed to transmit on one or more of the TRPs of the plurality of TRPs, the apparatus 1502 includes means for determining, for each TRP of the one or more of the TRPs, whether the evaluated CR for the TRP is less than the determined CR limit for the TRP. The apparatus 1502 includes means for determining that the UE allowed to transmit on the TRP when the evaluated CR for the TRP is less than the determined CR limit for the TRP.

In another configuration, the apparatus 1502 includes means for determining one CR limit for the plurality of TRPs based on the determined CBR for each TRP of the plurality of TRPs, where the at least one CR limit is the one CR limit. In one example, the one or more TRPs may comprise the plurality of TRPs. In determining whether the UE is allowed to transmit on the plurality of TRPs, the apparatus 1502 includes means for determining that whether a sum of the evaluated CRs for the plurality of TRPs is less than the determined one CR limit. The apparatus 1502 includes means for determining that the UE allowed to transmit on the TRP when the sum of the evaluated CRs for the plurality of TRPs is less than the determined one CR limit. In another example, in determining whether the UE is allowed to transmit on one or more of the TRPs of the plurality of TRPs, the apparatus 1502 includes means for determining, for each TRP of the one or more of the TRPs, whether the evaluated CR for the TRP is less than the determined one CR limit. The apparatus 1502 includes means for determining that it is allowed to transmit on the TRP when the evaluated CR for the TRP is less than the determined one CR limit. In such configuration, the one CR limit may be determined based on one of a maximum, a minimum, a mean, or a median CBR of the determined CBRs for the plurality of TRPs. Additionally or alternatively, the one CR limit may be determined based on mapping from a table or a function based on one or more of the determined CBRs of the plurality of TRPs.

In another configuration, the apparatus 1502 includes means for determining a CBR for the plurality of TRPs, where the at least one CR limit is based on the determined CBR for the plurality of TRPs. In such configuration, the determination of the CBR for the plurality of TRPs may be based on a maximum SL RSSI measurements within a CBR measurement window, and the maximum SL RSSI may be determined from among a set of SL RSSIs where each SL RSSI is determined at one TRP of the plurality of TRPs. As such, the apparatus 1502 includes means for determining one CR limit for the plurality of TRPs based on the determined CBR for the plurality of TRPs, where the at least one CR limit is the one CR limit. In one example, the one or more TRPs may comprise the plurality of TRPs, and in determining whether the UE is allowed to transmit on the plurality of TRPs, the apparatus 1502 includes means for determining whether a sum of the evaluated CRs for the plurality of TRPs is less than the determined one CR limit. The apparatus 1502 includes means for determine that the UE allowed to transmit on the TRP when the sum of the evaluated CRs for the plurality of TRPs is less than the determined one CR limit. In another example, in determining whether the UE is allowed to transmit on one or more of the TRPs of the plurality of TRPs, the apparatus 1502 includes means for determining, for each TRP of the one or more of the TRPs, whether the evaluated CR for the TRP is less than the determined one CR limit. The apparatus 1502 includes means for determining that the UE is allowed to transmit on the TRP when the evaluated CR for the TRP is less than the determined one CR limit.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects presented herein optimize and improve congestion control for UEs with multiple TRPs, where the CR evaluation and/or the CR limit determination may be performed at each individual TRP. Thus, the UE may make more accurate determination on whether to transmit on one or more TRPs based at least in part on each TRP's CR evaluation. The disclosed congestion control mechanism may provide more flexible resource usage, MCS, and/or maximum transmit power for the UEs with multiple TRPs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
evaluating a channel occupancy ratio (CR) for each transmission reception point (TRP) of a plurality of TRPs at the UE;
determining whether the UE is allowed to transmit on one or more of the TRPs of the plurality of TRPs based at least on the evaluated CR for each TRP of the plurality of TRPs and on at least one CR limit; and
transmitting on at least one TRP of the one or more of the TRPs based on the determination whether to transmit on the one or more TRPs.

2. The method of claim 1, further comprising determining a channel busy ratio (CBR) for each TRP of the plurality of TRPs, wherein the at least one CR limit is based on the determined CBR for each TRP of the plurality of TRPs.

3. The method of claim 2, wherein the determination of the CBR for each TRP is based on sidelink (SL) received signal strength indicator (RSSI) measurements for the TRP within a CBR measurement window.

4. The method of claim 2, further comprising determining a CR limit for each TRP of the plurality of TRPs based on the determined CBR for a corresponding TRP, wherein the at least one CR limit is a plurality of CR limits corresponding to the plurality of TRPs.

5. The method of claim 4, wherein the determining whether the UE is allowed to transmit on one or more of the TRPs of the plurality of TRPs comprises:
determining, for each TRP of the one or more of the TRPs, whether the evaluated CR for the TRP is less than the determined CR limit for the TRP; and
determining that the UE is allowed to transmit on the TRP when the evaluated CR for the TRP is less than the determined CR limit for the TRP.

6. The method of claim 2, further comprising determining one CR limit for the plurality of TRPs based on the determined CBR for each TRP of the plurality of TRPs, wherein the at least one CR limit is the one CR limit.

7. The method of claim 6, wherein the one or more TRPs comprises the plurality of TRPs, and the determining whether the UE is allowed to transmit on the plurality of TRPs comprises:
determining whether a sum of the evaluated CRs for the plurality of TRPs is less than the determined one CR limit; and
determining that the UE is allowed to transmit on the TRP when the sum of the evaluated CRs for the plurality of TRPs is less than the determined one CR limit.

8. The method of claim 6, wherein the determining whether the UE is allowed to transmit on one or more of the TRPs of the plurality of TRPs comprises:
determining, for each TRP of the one or more of the TRPs, whether the evaluated CR for the TRP is less than the determined one CR limit; and
determining that the UE is allowed to transmit on the TRP when the evaluated CR for the TRP is less than the determined one CR limit.

9. The method of claim 6, wherein the one CR limit is determined based on one of a maximum, a minimum, a mean, or a median CBR of the determined CBRs for the plurality of TRPs.

10. The method of claim 6, wherein the one CR limit is determined based on mapping from a table or a function based on one or more of the determined CBRs of the plurality of TRPs.

11. The method of claim 1, further comprising determining a channel busy ratio (CBR) for the plurality of TRPs, wherein the at least one CR limit is based on the determined CBR for the plurality of TRPs.

12. The method of claim 11, wherein the determination of the CBR for the plurality of TRPs is based on a maximum sidelink (SL) received signal strength indicator (RSSI) measurements within a CBR measurement window, and the maximum SL RSSI is determined from among a set of SL RSSIs where each SL RSSI is determined at one TRP of the plurality of TRPs.

13. The method of claim 12, further comprising determining one CR limit for the plurality of TRPs based on the determined CBR for the plurality of TRPs, wherein the at least one CR limit is the one CR limit.

14. The method of claim 13, wherein the one or more TRPs comprises the plurality of TRPs, and the determining whether the UE is allowed to transmit on the plurality of TRPs comprises:
determining whether a sum of the evaluated CRs for the plurality of TRPs is less than the determined one CR limit; and determining that the UE is allowed to transmit on the TRP when the sum of the evaluated CRs for the plurality of TRPs is less than the determined one CR limit.

15. The method of claim 13, wherein the determining whether the UE is allowed to transmit on one or more of the TRPs of the plurality of TRPs comprises:
   determining, for each TRP of the one or more of the TRPs, whether the evaluated CR for the TRP is less than the determined one CR limit; and
   determining that the UE is allowed to transmit on the TRP when the evaluated CR for the TRP is less than the determined one CR limit.

16. The method of claim 1, wherein the plurality of TRPs comprises M TRPs, M being an integer greater than 1, and the CR for each TRP of the plurality of TRPs is determined based on a sum of CRs across at least one priority value, where the sum is increased by 1 for a transmission on the TRP of the plurality of TRPs.

17. The method of claim 1, wherein the plurality of TRPs comprises M TRPs, M being an integer greater than 1, and the CR for each TRP of the plurality of TRPs is determined based on a sum of CRs across at least one priority value, where the sum is increased by 1/M for a transmission on the TRP of the plurality of TRPs.

18. The method of claim 1, wherein the CR for each TRP of the plurality of TRPs is determined based on a sum of CRs across at least one priority value, and the CRs are determined based on a percentage P of power allocated to a corresponding TRP, where the sum is increased by P for a transmission on the TRP of the plurality of TRPs.

19. The method of claim 1, wherein the CR for each TRP of the plurality of TRPs is determined based on at least one priority value.

20. An apparatus for wireless communication of a user equipment (UE), comprising:
   at least one memory; and
   at least one processor coupled to the at least one memory and configured to:
      evaluate a channel occupancy ratio (CR) for each transmission reception point (TRP) of a plurality of TRPs at the UE;
      determine whether the UE is allowed to transmit on one or more of the TRPs of the plurality of TRPs based at least on the evaluated CR for each TRP of the plurality of TRPs and on at least one CR limit; and
      transmit on at least one TRP of the one or more of the TRPs based on the determination whether to transmit on the one or more TRPs.

21. The apparatus of claim 20, wherein the at least one processor coupled to the memory is further configured to: determine a channel busy ratio (CBR) for each TRP of the plurality of TRPs, wherein the at least one CR limit is based on the determined CBR for each TRP of the plurality of TRPs.

22. The apparatus of claim 21, wherein the determination of the CBR for each TRP is based on sidelink (SL) received signal strength indicator (RSSI) measurements for the TRP within a CBR measurement window.

23. The apparatus of claim 22, wherein the at least one processor coupled to the memory is further configured to: determine a CR limit for each TRP of the plurality of TRPs based on the determined CBR for a corresponding TRP, wherein the at least one CR limit is a plurality of CR limits corresponding to the plurality of TRPs.

24. The apparatus of claim 23, wherein the determining whether the UE is allowed to transmit on one or more of the TRPs of the plurality of TRPs comprises the at least one processor configured to:
   determine, for each TRP of the one or more of the TRPs, whether the evaluated CR for the TRP is less than the determined CR limit for the TRP; and
   determine that the UE is allowed to transmit on the TRP when the evaluated CR for the TRP is less than the determined CR limit for the TRP.

25. The apparatus of claim 21, wherein the at least one processor coupled to the memory is further configured to: determine one CR limit for the plurality of TRPs based on the determined CBR for each TRP of the plurality of TRPs, wherein the at least one CR limit is the one CR limit.

26. The apparatus of claim 25, wherein the one or more TRPs comprises the plurality of TRPs, and the determining whether the UE is allowed to transmit on the plurality of TRPs comprises the at least one processor configured to:
   determine whether a sum of the evaluated CRs for the plurality of TRPs is less than the determined one CR limit; and
   determine that the UE is allowed to transmit on the TRP when the sum of the evaluated CRs for the plurality of TRPs is less than the determined one CR limit.

27. The apparatus of claim 25, wherein the determining whether the UE is allowed to transmit on one or more of the TRPs of the plurality of TRPs comprises the at least one processor configured to:
   determine, for each TRP of the one or more of the TRPs, whether the evaluated CR for the TRP is less than the determined one CR limit; and
   determine that the UE is allowed to transmit on the TRP when the evaluated CR for the TRP is less than the determined one CR limit.

28. The apparatus of claim 25, wherein the one CR limit is determined based on one of a maximum, a minimum, a mean, or a median CBR of the determined CBRs for the plurality of TRPs.

29. The apparatus of claim 25, wherein the one CR limit is determined based on mapping from a table or a function based on one or more of the determined CBRs of the plurality of TRPs.

30. The apparatus of claim 20, wherein the at least one processor coupled to the memory is further configured to: determine a channel busy ratio (CBR) for the plurality of TRPs, wherein the at least one CR limit is based on the determined CBR for the plurality of TRPs.

31. The apparatus of claim 30, wherein the determination of the CBR for the plurality of TRPs is based on a maximum sidelink (SL) received signal strength indicator (RSSI) measurements within a CBR measurement window, and the maximum SL RSSI is determined from among a set of SL RSSIs where each SL RSSI is determined at one TRP of the plurality of TRPs.

32. The apparatus of claim 31, wherein the at least one processor coupled to the memory is further configured to: determine one CR limit for the plurality of TRPs based on the determined CBR for the plurality of TRPs, wherein the at least one CR limit is the one CR limit.

33. The apparatus of claim 32, wherein the one or more TRPs comprises the plurality of TRPs, and the determining whether the UE is allowed to transmit on the plurality of TRPs comprises the at least one processor configured to:
   determine whether a sum of the evaluated CRs for the plurality of TRPs is less than the determined one CR limit; and determine that the UE is allowed to transmit on the TRP when the sum of the evaluated CRs for the plurality of TRPs is less than the determined one CR limit.

34. The apparatus of claim 32, wherein the determining whether the UE is allowed to transmit on one or more of the TRPs of the plurality of TRPs comprises the at least one processor configured to:
  determine, for each TRP of the one or more of the TRPs, whether the evaluated CR for the TRP is less than the determined one CR limit; and
  determine that the UE is allowed to transmit on the TRP when the evaluated CR for the TRP is less than the determined one CR limit.

35. The apparatus of claim 20, wherein the plurality of TRPs comprises M TRPs, M being an integer greater than 1, and the CR for each TRP of the plurality of TRPs is determined based on a sum of CRs across at least one priority value, where the sum is increased by 1 for a transmission on the TRP of the plurality of TRPs.

36. The apparatus of claim 20, wherein the plurality of TRPs comprises M TRPs, M being an integer greater than 1, and the CR for each TRP of the plurality of TRPs is determined based on a sum of CRs across at least one priority value, where the sum is increased by 1/M for a transmission on the TRP of the plurality of TRPs.

37. The apparatus of claim 20, wherein the CR for each TRP of the plurality of TRPs is determined based on a sum of CRs across at least one priority value, and the CRs are determined based on a percentage P of power allocated to a corresponding TRP, where the sum is increased by P for a transmission on the TRP of the plurality of TRPs.

38. The apparatus of claim 20, wherein the CR for each TRP of the plurality of TRPs is determined based on at least one priority value.

39. An apparatus for wireless communication of a user equipment (UE), comprising:
  means for evaluating a channel occupancy ratio (CR) for each transmission reception point (TRP) of a plurality of TRPs at the UE;
  means for determining whether the UE is allowed to transmit on one or more of the TRPs of the plurality of TRPs based at least on the evaluated CR for each TRP of the plurality of TRPs and on at least one CR limit; and
  means for transmitting on at least one TRP of the one or more of the TRPs based on the determination whether to transmit on the one or more TRPs.

40. The apparatus of claim 39, further comprising means for determining a channel busy ratio (CBR) for each TRP of the plurality of TRPs, wherein the at least one CR limit is based on the determined CBR for each TRP of the plurality of TRPs.

41. The apparatus of claim 40, wherein the determination of the CBR for each TRP is based on sidelink (SL) received signal strength indicator (RSSI) measurements for the TRP within a CBR measurement window.

42. The apparatus of claim 40, further comprising means for determining a CR limit for each TRP of the plurality of TRPs based on the determined CBR for a corresponding TRP, wherein the at least one CR limit is a plurality of CR limits corresponding to the plurality of TRPs.

43. The apparatus of claim 42, wherein the means for determining whether the UE is allowed to transmit on one or more of the TRPs of the plurality of TRPs is configured to:
  determine, for each TRP of the one or more of the TRPs, whether the evaluated CR for the TRP is less than the determined CR limit for the TRP; and
  determine that the UE is allowed to transmit on the TRP when the evaluated CR for the TRP is less than the determined CR limit for the TRP.

44. The apparatus of claim 40, further comprising means for determining one CR limit for the plurality of TRPs based on the determined CBR for each TRP of the plurality of TRPs, wherein the at least one CR limit is the one CR limit.

45. The apparatus of claim 44, wherein the one or more TRPs comprises the plurality of TRPs, and the means for determining whether the UE is allowed to transmit on the plurality of TRPs is configured to:
  determine whether a sum of the evaluated CRs for the plurality of TRPs is less than the determined one CR limit; and
  determine that the UE is allowed to transmit on the TRP when the sum of the evaluated CRs for the plurality of TRPs is less than the determined one CR limit.

46. The apparatus of claim 44, wherein the means for determining whether the UE is allowed to transmit on one or more of the TRPs of the plurality of TRPs is configured to:
  determine, for each TRP of the one or more of the TRPs, whether the evaluated CR for the TRP is less than the determined one CR limit; and
  determine that the UE is allowed to transmit on the TRP when the evaluated CR for the TRP is less than the determined one CR limit.

47. The apparatus of claim 44, wherein the one CR limit is determined based on one of a maximum, a minimum, a mean, or a median CBR of the determined CBRs for the plurality of TRPs.

48. The apparatus of claim 44, wherein the one CR limit is determined based on mapping from a table or a function based on one or more of the determined CBRs of the plurality of TRPs.

49. The apparatus of claim 39, further comprising means for determining a channel busy ratio (CBR) for the plurality of TRPs, wherein the at least one CR limit is based on the determined CBR for the plurality of TRPs.

50. The apparatus of claim 49, wherein the determination of the CBR for the plurality of TRPs is based on a maximum sidelink (SL) received signal strength indicator (RSSI) measurements within a CBR measurement window, and the maximum SL RSSI is determined from among a set of SL RSSIs where each SL RSSI is determined at one TRP of the plurality of TRPs.

51. The apparatus of claim 50, further comprising means for determining one CR limit for the plurality of TRPs based on the determined CBR for the plurality of TRPs, wherein the at least one CR limit is the one CR limit.

52. The apparatus of claim 51, wherein the one or more TRPs comprises the plurality of TRPs, and the means for determining whether the UE is allowed to transmit on the plurality of TRPs is configured to:
  determine whether a sum of the evaluated CRs for the plurality of TRPs is less than the determined one CR limit; and
  determine that the UE is allowed to transmit on the TRP when the sum of the evaluated CRs for the plurality of TRPs is less than the determined one CR limit.

53. The apparatus of claim 51, wherein the means for determining whether the UE is allowed to transmit on one or more of the TRPs of the plurality of TRPs is configured to:
  determine, for each TRP of the one or more of the TRPs, whether the evaluated CR for the TRP is less than the determined one CR limit; and determine that the UE is allowed to transmit on the TRP when the evaluated CR for the TRP is less than the determined one CR limit.

54. The apparatus of claim 39, wherein the plurality of TRPs comprises M TRPs, M being an integer greater than 1, and the CR for each TRP of the plurality of TRPs is determined based on a sum of CRs across at least one priority value, where the sum is increased by 1 for a transmission on the TRP of the plurality of TRPs.

55. The apparatus of claim 39, wherein the plurality of TRPs comprises M TRPs, M being an integer greater than 1, and the CR for each TRP of the plurality of TRPs is determined based on a sum of CRs across at least one priority value, where the sum is increased by 1/M for a transmission on the TRP of the plurality of TRPs.

56. The apparatus of claim 39, wherein the CR for each TRP of the plurality of TRPs is determined based on a sum of CRs across at least one priority value, and the CRs are determined based on a percentage P of power allocated to a corresponding TRP, where the sum is increased by P for a transmission on the TRP of the plurality of TRPs.

57. The apparatus of claim 39, wherein the CR for each TRP of the plurality of TRPs is determined based on at least one priority value.

58. A non-transitory computer-readable medium storing computer executable code for wireless communication of a user equipment (UE), the code when executed by a processor cause the processor to:
  evaluate a channel occupancy ratio (CR) for each transmission reception point (TRP) of a plurality of TRPs at the UE;
  determine whether the UE is allowed to transmit on one or more of the TRPs of the plurality of TRPs based at least on the evaluated CR for each TRP of the plurality of TRPs and on at least one CR limit; and
  transmit on at least one TRP of the one or more of the TRPs based on the determination whether to transmit on the one or more TRPs.

* * * * *